(12) United States Patent
Kojima

(10) Patent No.: US 8,351,389 B2
(45) Date of Patent: Jan. 8, 2013

(54) COMMUNICATION SYSTEM, METHOD, AND COMMUNICATION APPARATUS

(75) Inventor: Yuji Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 222 days.

(21) Appl. No.: 12/911,359

(22) Filed: Oct. 25, 2010

(65) Prior Publication Data

US 2011/0032860 A1    Feb. 10, 2011

Related U.S. Application Data

(63) Continuation of application No. PCT/JP2008/058434, filed on May 2, 2008.

(51) Int. Cl.
*H04W 4/00* (2009.01)
*H04W 72/04* (2009.01)

(52) U.S. Cl. .................. 370/329; 370/338; 370/341

(58) Field of Classification Search .............. None
See application file for complete search history.

(56) References Cited

U.S. PATENT DOCUMENTS

| | | | | |
|---|---|---|---|---|
| 2005/0265350 | A1* | 12/2005 | Narasimha et al. | 370/395.2 |
| 2005/0272481 | A1* | 12/2005 | Kim | 455/574 |
| 2006/0009241 | A1* | 1/2006 | Ryu et al. | 455/458 |
| 2007/0055778 | A1* | 3/2007 | Park et al. | 709/226 |
| 2007/0086395 | A1* | 4/2007 | Bakshi et al. | 370/338 |
| 2008/0139206 | A1* | 6/2008 | Touray et al. | 455/437 |
| 2008/0153491 | A1* | 6/2008 | Cho et al. | 455/435.1 |
| 2009/0280840 | A1* | 11/2009 | Xu et al. | 455/458 |
| 2010/0110965 | A1 | 5/2010 | Kojima | |

FOREIGN PATENT DOCUMENTS

| | | |
|---|---|---|
| EP | 1 804 526 | 7/2007 |
| JP | 2008-035248 | 2/2008 |
| WO | 2009/011047 | 1/2009 |

OTHER PUBLICATIONS

International Search Report issued for corresponding International Patent Application No. PCT/JP2008/058434, mailed Jun. 10, 2008.
Kiseon Ryu et al; MBS clarification, IEEE 802.16 Broadband Wireless Access Working Group, IEEE C802.16e-05/171r1; dated Mar. 10, 2005;[Internet: <URL:http://www.ieee802.org/16/tge/contrib/C80216e-05_17lrl.pdf>; [Ref.: ISR mailed Jun. 10, 2008].

(Continued)

*Primary Examiner* — Chi Pham
*Assistant Examiner* — Soon-Dong D Hyun
(74) *Attorney, Agent, or Firm* — Myers Wolin, LLC

(57) ABSTRACT

A base station in a communication system where mobile stations receive paging announce using a discontinuously received reception frame and the mobile stations receive multicast data as well as the paging announce, in which the mobile stations in idle mode are searched for from among the mobile stations receiving multicast data, the mobile stations located where a paging group to which the searched-for mobile stations belong overlaps an area where the multicast data are distributed are selected from among the searched-for mobile stations, and the base station includes a radio resource allocating unit allocating radio resources to the selected mobile stations, the radio resources being for transmitting uplink signal, and an allocated radio resource information including unit including information of radio resources allocated by the radio resource allocating unit in a radio frame transmitting the multicast data to be transmitted to the selected mobile stations.

15 Claims, 21 Drawing Sheets

OTHER PUBLICATIONS

IEEE Computer Society and the IEEE Microwave Theory and Techniques Society; IEEE Standard for Local and metropolitan area networks; Part 16: Air Interface for Fixed and Mobile Broadband Wireless Access Systems; Amendment 2; Physical and medium Access Control Layers for Combined Fixed and Mobile Operation in Licensed Bands and Corrigendum 1; IEEE Std. 802.16e -2005 and IEEE Std. 802.16 2004/Cor1 -2005; (Amendment and Corrigendum to IEEE Std. 802.16-2004; IEEE, 3 Park Ave., New York, NY 10016-5997; Dated Feb. 28, 2006.

IEEE Computer Society and the IEEE Microwave Theory and Techniques Society; IEEE Standard for Local and metropolitan area networks; Part 16: Air Interface for Fixed Broadband Wireless Access Systems; IEEE Std. 802.16 -2004, (Revision of IEEE Std. 802.16-2001); Sponsored by the LAN/MAN Standards Committee; IEEE, 3 Park Ave., New York, NY 10016-5997; Dated Oct. 1, 2004.

* cited by examiner

FIG.9

MBS_MAP message format

| Syntax | Notes |
|---|---|
| MBS_MAP Message format (){ | |
|     Management Message Type = 62 | TYPE VALUE OF MBS_MAP message IS 62 |
|     ················· | OMITTED |
|     #MBS_DATA_IE | THE NUMBER OF INCLUDED MBS_DATA_IE |
|     for (i = 0; i < n; i++){ | |
|         MBS_DATA_IE | |
|     } | |
|     #Extended_MBS_DATA_IE | THE NUMBER OF INCLUDED Extended_MBS_DATA_IE |
|     for(i = 0; i < k; i++) { | |
|         Extended_MBS_DATA_IE() | |
|     } | |
|     #MBS_DATA_Time_Diversity_IE | THE NUMBER OF INCLUDED MBS_DATA_Time_Diversity_IE |
|     for(i = 0; i < m; i++){ | |
|         MBS_DATA_Time_Diversity_IE() | |
|     } | |
|     if(!byte boundary){ | |
|         Padding Nibble | PADDING |
|     } | |
|     TLV encoding element | |
| } | |

FIG.10
MBS_DATA_IE format

| Syntax | Notes |
|---|---|
| MBS_DATA_IE() { | |
|   MBS_MAP Type = 0 | TYPE VALUE OF MBS_DATA_IE IS 0 |
|   MBS Burst Frame Offset | THIS INDICATES FRAME TRANSMITTING MBS burst WHICH IS TARGET OF THIS IE. THIS INDICATES "Frame Offset+2" FRAME AFTER CURRENT FRAME. |
|   Next MBS MAP change indication | THIS INDICATE WHETHER SIZE OF NEXT MBS_MAP_message IS CHANGED. |
|   No. of Multicast CID | THE NUMBER OF INCLUDED Multicast CID |
|   for(i = 0; i < No. of Multicast CID; i++){ | |
|     Multicast CID | Multicast CID OF MULTICAST DATA TRANSMITTED BY TARGET MBS burst OF THIS IE |
|   } | |
|   MBS DIUC | ATTRIBUTION INFORMATION OF TARGET MBS burst OF THIS IE (DETAIL OMITTED) |
|   OFDMA Symbol Offset | OFDMA Symbol Offset OF TARGET MBS burst OF THIS IE. SUCH A Offset VALUE INDICATING "k+13" IN A CASE OF "MBS burst#1" IN FIG.8. |
|   Subchannel Offset | Subchannel Offset OF TARGET MBS burst OF THIS IE. SUCH A Offset VALUE INDICATING "s" IN A CASE OF "MBS burst #1" IN FIG.8. |
|   Boosting | ATTRIBUTION INFORMATION OF TARGET MBS burst OF THIS IE (DETAIL OMITTED) |
|   No. OFDMA Symbols | SIZE OF TARGET MBS burst OF THIS IE (LATERAL AXIS IN FIG.8: THE NUMBER OF OFDMA Symbols) |
|   No. Subchannels | SIZE OF TARGET MBS burst OF THIS IE (VERTICAL AXIS IN FIG.8: THE NUMBER OF Subchannel) |
|   Repetition Coding Indication | ATTRIBUTION INFORMATION OF TARGET MBS burst OF THIS IE (DETAIL OMITTED) |
|   Next MBS Frame Offset | THIS INDICATES FRAME TRANSMITTING NEXT MBS_MAP message. THIS INDICATES "MBS Frame Offset" FRAME AFTER CURRENT FRAME. |
|   Next MBS OFDMA Symbol Offset | THIS INDICATES POSITION OF MBS Region IN FRAME TRANSMITTING NEXT MBS_MAP message. Offset VALUE INDICATING SUCH AS "k+11" IN CASE OF FIG.8. |
|   if (Next MBS MAP change indication == 1){ | |
|     Next MBS No. OFDMA Symbols | SIZE OF NEXT MBS_MAP message (LATERAL AXIS IN FIG.8: THE NUMBER OF OFDMA Symbols) |
|     Next MBS No. OFDMA Subchannels | SIZE OF NEXT MBS_MAP message (VERTICAL AXIS IN FIG.8: THE NUMBER OF Subchannel) |
|   } | |
|   No. of MBS_ACK_Alloc_IE | THE NUMBER OF INCLUDED MBS_ACK_Alloc_IE |
|   for (i=0; i < No. of MBS_ACK_Alloc_IE; i++){ | |
|     MBS_ACK_Alloc_IE() | UPLINK BAND ALLOCATION INFORMATION TO RETURN ACK. |
|   } | |
| } | |

(※) UNDERLINE: NEWLY PROVIDED PARAMETER

FIG.11

MBS_ACK_Alloc_IE format

| Syntax | Notes |
|---|---|
| MBS_ACK_Alloc_IE() { | |
| MSID | ALLOCATION TARGET MOBILE STATION IDENTIFIER |
| Allocation Offset | THIS INDICATES Fast_Feedback_Slot NUMBER IN Fast_Feedback_Region. |
| Frame Offset | THIS INDICATES FRAME TRANSMITTING Fast_Feedback_Region INCLUDING ALLOCATION TARGET Fast_Feedback_Slot. THIS INDICATES "Frame Offset" FRAME AFTER CURRENT FRAME. |
| } | |

(※) UNDERLINE: NEWLY PROVIDED PARAMETER

FIG.12

MBS_MAP_IE format

| Syntax | Notes |
|---|---|
| MBS_MAP_IE() { | |
|     Extended-2 DIUC | MBS MAP IE=0x00 |
|     Length | |
|     MBS Zone identifier | MBS Zone ID |
|     Macro diversity enhanced | WHETHER MACRO DIVERSITY IS PERFORMED ON MBS Region DESIGNATED BY THIS MBS_MAP_IE. WHEN PERFORMED, IT IS IN Multi-BS MBS, AND WHEN NOT PERFORMED, IT IS IN Single-BS MBS. |
|     If(Macro diversity enhanced = 1){ | |
|     ·········· | IN CASE OF Multi-BS MBS, MBS Region IS DESIGNATED (DETAIL OMITTED) |
|     } | |
|     } else { | |
|     ·········· | IN CASE OF Multi-BS MBS, MBS Region IS DESIGNATED (DETAIL OMITTED) |
|     } | |
|     <u>No. of MBS_ACK_Alloc_IE</u> | THE NUMBER OF INCLUDED MBS_ACK_Alloc_IE |
|     for (i=0; i < No. of MBS_ACK_Alloc_IE; i++){ | |
|         <u>MBS_ACK_Alloc_IE()</u> | UPLINK BAND ALLOCATION INFORMATION TO RETURN ACK. |
|     } | |
|     if !(byte boundary) { | |
|         Padding Nibble | PADDING |
|     } | |
| } | |

(※) <u>UNDERLINE</u>: NEWLY PROVIDED PARAMETER

FIG.13

MBS_DATA_IE format

| Syntax | Notes |
|---|---|
| MBS_DATA_IE() { | |
| MBS_MAP Type = 0 | TYPE VALUE OF MBS_DATA_IE IS 0 |
| MBS Burst Frame Offset | THIS INDICATES FRAME TRANSMITTING MBS burst WHICH IS TARGET OF THIS IE. THIS INDICATES "Frame Offset+2" FRAME AFTER CURRENT FRAME. |
| Next MBS MAP change indication | THIS INDICATE WHETHER SIZE OF NEXT MBS_MAP_message IS CHANGED. |
| No. of Multicast CID | THE NUMBER OF INCLUDED Multicast CID |
| for(i = 0; i < No. of Multicast CID; i++){ | |
| Multicast CID | Multicast CID OF MULTICAST DATA TRANSMITTED BY TARGET MBS burst OF THIS IE |
| } | |
| MBS DIUC | ATTRIBUTION INFORMATION OF TARGET MBS burst OF THIS IE (DETAIL OMITTED) |
| OFDMA Symbol Offset | OFDMA Symbol Offset OF TARGET MBS burst OF THIS IE. SUCH A Offset VALUE INDICATING "k+13" IN A CASE OF "MBS burst#1" IN FIG.8. |
| Subchannel Offset | Subchannel Offset OF TARGET MBS burst OF THIS IE. SUCH A Offset VALUE INDICATING "s" IN A CASE OF "MBS burst#1" IN FIG.8. |
| Boosting | ATTRIBUTION INFORMATION OF TARGET MBS burst OF THIS IE (DETAIL OMITTED) |
| No. OFDMA Symbols | SIZE OF TARGET MBS burst OF THIS IE (LATERAL AXIS IN FIG.8: THE NUMBER OF OFDMA Symbols) |
| No. Subchannels | SIZE OF TARGET MBS burst OF THIS IE (VERTICAL AXIS IN FIG.8: THE NUMBER OF Subchannel) |
| Repetition Coding Indication | ATTRIBUTION INFORMATION OF TARGET MBS burst OF THIS IE (DETAIL OMITTED) |
| Next MBS Frame Offset | THIS INDICATES FRAME TRANSMITTING NEXT MBS_MAP message. THIS INDICATES "MBS Frame Offset" FRAME AFTER CURRENT FRAME. |
| Next MBS OFDMA Symbol Offset | THIS INDICATES POSITION OF MBS Region IN FRAME TRANSMITTING NEXT MBS_MAP message. Offset VALUE INDICATING SUCH AS "k+11" IN CASE OF FIG.8. |
| if (Next MBS MAP change indication == 1){ | |
| Next MBS No. OFDMA Symbols | SIZE OF NEXT MBS_MAP message (LATERAL AXIS IN FIG.8: THE NUMBER OF OFDMA Symbols) |
| Next MBS No. OFDMA Subchannels | SIZE OF NEXT MBS_MAP message (VERTICAL AXIS IN FIG.8: THE NUMBER OF Subchannel) |
| } | |
| No. of MBS_CQICH_Alloc_IE | THE NUMBER OF INCLUDED MBS_CQICH_Alloc_IE |
| for (i=0; i < No. of MBS_CQICH_Alloc_IE; i++){ | |
| MBS_CQICH_Alloc_IE() | UPLINK BAND ALLOCATION INFORMATION TO RETURN CQI. |
| } | |
| } | |

(※) UNDERLINE: NEWLY PROVIDED PARAMETER

FIG.14

MBS_CQICH_Alloc_IE format

| Syntax | Notes |
| --- | --- |
| MBS_CQICH_Alloc_IE() { | |
| MSID | ALLOCATION TARGET MOBILE STATION IDENTIFIER |
| CQICH_ID | CQICH ID ALLOCATED TO ABOVE MOBILE STATION IDENTIFIER |
| Allocation Offset | THIS INDICATES Fast_Feedback_Slot NUMBER IN Fast_Feedback_Region. |
| Period(p) | CQI IS FEEDBACKED EVERY $2^p$ FRAMES (NOT ESSENTIAL) |
| Frame Offset | THIS INDICATES FRAME TRANSMITTING Fast_Feedback_Region INCLUDING ALLOCATION TARGET Fast_Feedback_Slot. THIS INDICATES "Frame Offset" FRAME AFTER THE CURRENT FRAME. WHEN Period OR Duration IS DESIGNATED, THIS FRAME IS A START POINT TO FEEDBACK CQI. |
| Duration (d) | FRAME PERIOD TO FEEDBACK CQI (NOT ESSENTIAL) |
| Report configuration included | WHETHER TYPE TO FEEDBACK CQI DESCRIBED BELOW IS INCLUDED. |
| If (report configuration included == 1) { | |
| ................ | TYPE TO FEEDBACK CQI (DETAIL OMITTED) |
| } | |
| MIMO_permutation_feedback_cycle | MIMO RELATED INFORMATION (DETAIL OMITTED) |
| Padding | PADDING |
| } | |

(※) UNDERLINE: NEWLY PROVIDED PARAMETER

FIG.15

MBS_MAP_IE format

| Syntax | Notes |
|---|---|
| MBS_MAP_IE() { | |
|     Extended-2 DIUC | MBS MAP IE=0x00 |
|     Length | |
|     MBS Zone identifier | MBS Zone ID |
|     Macro diversity enhanced | WHETHER MACRO DIVERSITY IS PERFORMED ON MBS Region DESIGNATED BY THIS MBS_MAP_IE. WHEN PERFORMED, IT IS IN Multi-BS MBS, AND WHEN NOT PERFORMED, IT IS IN Single-BS MBS. |
|     If(Macro diversity enhanced = 1){ | |
|         ................. | IN CASE OF Multi-BS MBS, MBS Region IS DESIGNATED (DETAIL OMITTED) |
|     } | |
|     } else { | |
|         ................. | IN CASE OF Multi-BS MBS, MBS Region IS DESIGNATED (DETAIL OMITTED) |
|     } | |
|     <u>No. of MBS_CQICH_Alloc_IE</u> | THE NUMBER OF INCLUDED MBS_CQICH_Alloc_IE |
|     for (i=0; i < No. of MBS_CQICH_Alloc_IE; i++){ | |
|         <u>MBS_CQICH_Alloc_IE()</u> | UPLINK BAND ALLOCATION INFORMATION TO RETURN CQI. |
|     } | |
|     if !(byte boundary) { | |
|         Padding Nibble | PADDING |
|     } | |
| } | |

(※) <u>UNDERLINE</u>: NEWLY PROVIDED PARAMETER

FIG.17

MBS_ACK_Alloc Extended Subheader

| Syntax | Notes |
|---|---|
| MBS_ACK_Alloc_Extended_Subheader() { | |
|   Extended subheader type | ALLOCATE TYPE VALUE RESERVED IN RELATED ART. |
|   No. of MBS_ACK_Alloc_IE | THE NUMBER OF INCLUDED MBS_ACK_Alloc_IE |
|   for (i=0; i < No. of MBS_ACK_Alloc_IE; i++){ | |
|     MBS_ACK_Alloc_IE() | UPLINK BAND ALLOCATION INFORMATION TO RETURN ACK. |
|   } | |
|   if !(byte boundary) { | |
|     Padding Nibble | PADDING |
|   } | |
| } | |

(※) UNDERLINE: NEWLY PROVIDED PARAMETER

FIG.18

MBS_CQICH_Alloc Extended Subheader

| Syntax | Notes |
|---|---|
| MBS_CQICH_Alloc_Extended_Subheader() { | |
|   Extended subheader type | ALLOCATE TYPE VALUE RESERVED IN RELATED ART. |
|   No. of MBS_CQICH_Alloc_IE | THE NUMBER OF INCLUDED MBS_CQI_Alloc_IE |
|   for (i=0; i < No. of MBS_CQICH_Alloc_IE; i++){ | |
|     MBS_CQICH_Alloc_IE() | UPLINK BAND ALLOCATION INFORMATION TO RETURN CQI. |
|   } | |
|   if !(byte boundary) { | |
|     Padding Nibble | PADDING |
|   } | |
| } | |

(※) UNDERLINE: NEWLY PROVIDED PARAMETER

FIG.19

UL-MAP IE format

| Syntax | Notes |
|---|---|
| UL-MAP_IE () { | |
|   CID | Multicast CID |
|   UIUC=15 | THIS INDICATES Extended UIUC. FIXED VALUE 15. |
|   MBS_ACK_IE() | UPLINK BAND ALLOCATION INFORMATION TO RETURN ACK. |
| } | |

(※) UNDERLINE: NEWLY PROVIDED PARAMETER

FIG.20
MBS_ACK_IE format

| Syntax | Notes |
|---|---|
| MBS_ACK_IE () { | |
|     Extended UIUC | ALLOCATE TYPE VALUE RESERVED IN RELATED ART. |
|     Length | |
|     <u>No. of MBS_ACK_Alloc_IE</u> | THE NUMBER OF INCLUDED MBS_ACK_Alloc_IE |
|     for (i=0; i < No. of MBS_ACK_Alloc_IE; i++){ | |
|         <u>MBS_ACK_Alloc_IE()</u> | UPLINK BAND ALLOCATION INFORMATION TO RETURN ACK. |
|     } | |
|     if !(byte boundary) { | |
|         Padding Nibble | PADDING |
|     } | |
| } | |

(※) <u>UNDERLINE</u>: NEWLY PROVIDED PARAMETER

FIG.21
UL-MAP IE format

| Syntax | Notes |
|---|---|
| UL-MAP_IE () { | |
|     CID | Multicast CID |
|     UIUC=15 | THIS INDICATES Extended UIUC. FIXED VALUE 15. |
|     <u>MBS_CQICH_IE()</u> | UPLINK BAND ALLOCATION INFORMATION TO RETURN CQI. |
| } | |

(※) <u>UNDERLINE</u>: NEWLY PROVIDED PARAMETER

FIG.22

MBS_CQICH_IE format

| Syntax | Notes |
|---|---|
| MBS_CQICH_IE () { | |
|   Extended UIUC | ALLOCATE TYPE VALUE RESERVED IN RELATED ART. |
|   Length | |
|   No. of MBS_CQICH_Alloc_IE | THE NUMBER OF INCLUDED MBS_CQI_Alloc_IE |
|   for (i=0; i < No. of MBS_CQICH_Alloc_IE; i++){ | |
|     MBS_CQICH_Alloc_IE() | UPLINK BAND ALLOCATION INFORMATION TO RETURN CQI. |
|   } | |
|   if !(byte boundary) { | |
|   Padding Nibble | PADDING |
|   } | |
| } | |

(※) UNDERLINE: NEWLY PROVIDED PARAMETER

FIG.23

UL-MAP IE format

| Syntax | Notes |
|---|---|
| UL-MAP_IE () { | |
|   CID | Multicast CID |
|   UIUC=15 | THIS INDICATES Extended UIUC. FIXED VALUE 15. |
|   MBS_UL_Burst_IE() | UPLINK BAND ALLOCATION INFORMATION TO DESIGNATE UL burst. |
| } | |

(※) UNDERLINE: NEWLY PROVIDED PARAMETER

FIG.24

MBS_UL_Burst_IE format

| Syntax | Notes |
| --- | --- |
| MBS_UL_Burst_IE () { | |
|     Extended UIUC | ALLOCATE TYPE VALUE RESERVED IN RELATED ART. |
|     Length | |
|     <u>MSID</u> | ALLOCATION TARGET MOBILE STATION IDENTIFIER |
|     <u>UIUC</u> | MODULATION INFORMATION OF UL burst DESIGNATED IN THIS IE |
|     <u>Duration</u> | THE NUMBER OF OFDMA SLOTS. SIZE OF UL burst DESIGNATED IN THIS IE IS DESIGNATED. |
|     Repetition Coding indication | ATTRIBUTION INFORMATION OF UL burst DESIGNATED IN THIS IE (DETAIL OMITTED) |
|     if (AAS or AMC UL Zone) { | |
|         Slot offset | AAS/AMC UL Zone RELATED INFORMATION (DETAIL OMITTED) |
|     } | |
|     if !(byte boundary) { | |
|         Padding Nibble | PADDING |
|     } | |
| } | |

(※) <u>UNDERLINE</u>: NEWLY PROVIDED PARAMETER

COMMUNICATION SYSTEM, METHOD, AND COMMUNICATION APPARATUS

CROSS-REFERENCE TO RELATED APPLICATIONS

This application is a U.S. continuation application filed under 35 USC 111(a) claiming benefit under 35 USC 120 and 365(c) of PCT application JP2008/058434, filed May 2, 2008. The foregoing application is hereby incorporated herein by reference.

FIELD

The embodiment discussed herein is related to a radio communication system.

BACKGROUND

Recently, IEEE (Institute of Electrical and Electronic Engineers) has been standardizing a radio communication scheme called WiMAX (Worldwide Interoperability for Microwave Access). In WiMAX, there are IEEE 802.16d and IEEE 802.16e. IEEE 802.16d is for non-movable subscriber stations and IEEE 802.16e is for movable subscriber stations. The movable subscriber stations include mobile stations (MS). Further, IEEE 802.16m is being standardized as a next-generation standard of IEEE 802.16e.

SUMMARY

According to an aspect of the present invention, there is provided a base station in a communication system where mobile stations receive paging announce using a discontinuously received reception frame and the mobile stations receive multicast data as well as the paging announce, wherein the mobile stations in idle mode are searched for from among the mobile stations receiving multicast data, the mobile stations located where a paging group to which the searched-for mobile stations belong overlaps an area where the multicast data are distributed are selected from among the searched-for mobile stations, and the base station includes a radio resource allocating unit allocating radio resources to the selected mobile stations, the radio resources being for transmitting an uplink signal; and an allocated radio resource information including unit including information of radio resources allocated by the radio resource allocating unit in a radio frame transmitting the multicast data to be transmitted to the selected mobile stations.

The object and advantages of the invention will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 9 is a drawing illustrating an MBS_MAP message format according to an embodiment of the present invention;

FIG. 10 is a drawing illustrating an MBS_DATA_IE format according to an embodiment of the present invention;

FIG. 11 is a drawing illustrating an MBS_ACK_Alloc_IE format according to an embodiment of the present invention;

FIG. 12 is a drawing illustrating an MBS_MAP_IE format according to an embodiment of the present invention;

FIG. 13 is a drawing illustrating the MBS_DATA_IE format according to an embodiment of the present invention;

FIG. 14 is a drawing illustrating the MBS_CQICH_Alloc_IE format according to an embodiment of the present invention;

FIG. 15 is a drawing illustrating the MBS_MAP_IE format according to an embodiment of the present invention;

FIG. 17 is a drawing illustrating an MBS_ACK_Alloc Extended Subheader according to an embodiment of the present invention;

FIG. 18 is a drawing illustrating an MBS_CQICH_Alloc Extended Subheader according to an embodiment of the present invention;

FIG. 19 is a drawing illustrating a UL-MAP IE format according to an embodiment of the present invention;

FIG. 20 is a drawing illustrating an MBS_ACK_IE format according to an embodiment of the present invention;

FIG. 21 is a drawing illustrating the UL-MAP IE format according to an embodiment of the present invention;

FIG. 22 is a drawing illustrating an MBS_CQICH_IE format according to an embodiment of the present invention;

FIG. 23 is a drawing illustrating the UL-MAP IE format according to an embodiment of the present invention; and FIG. 24 is a drawing illustrating an MBS_UL_Burst_IE format according to an embodiment of the present invention.

DESCRIPTION OF EMBODIMENT

Figure 1:
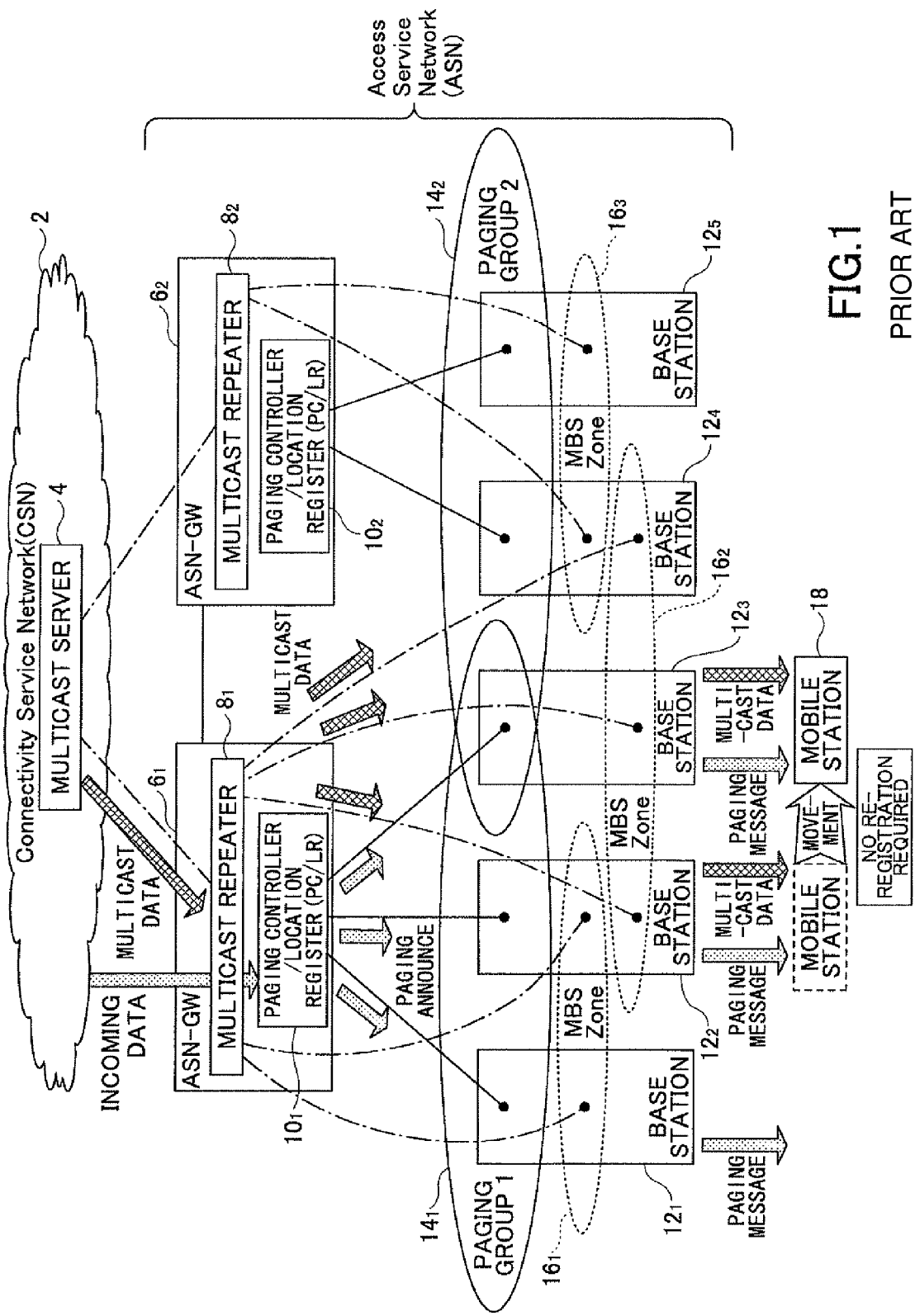
FIG. 1 is a drawing illustrating an example of a communication system.

For example, in IEEE 802.16e for the mobile stations, the mobile stations, base stations (BS), and paging controllers/location registers (PC/LR) support a discontinuous reception scheme. Herein, in the discontinuous reception scheme, idle mode and paging are provided.

Further, in IEEE 802.16e, the mobile stations, base stations, multicast repeaters, and a multicast server support a multicast distribution scheme. Further, in the multicast distribution scheme, a Multicast and Broadcast Service (MBS) is provided. The MBS may also be called a Multicast Broadcast Service (MCBCS).

In the following, the base stations, paging controllers/location registers (PC/LR), multicast repeaters, and multicast server are collectively called a radio base station side apparatus.

An example of a network is described with reference to FIG. 1.

The network includes a Connectivity Service Network (CSN) 2. Further, the network includes an Access Service Network (ASN). Further, the network includes a mobile station 18.

The CSN 2 includes a multicast server 4. The ASN includes an Access Service Network-Gateway (ASN-GW) 6. The ASN-GW 6 includes a multicast repeater 8. Further, the ASN-GW 6 includes a paging controller/location register (PC/LR) 10. Further, the ASN includes a base station 12.

The mobile station 18 in idle mode is not registered to any specific base station. The mobile station 18 in idle mode monitors a Paging Message periodically transmitted from all the base stations in a paging group 14. Further, the mobile station 18 in idle mode monitors and determines whether there is any traffic to the mobile station 18 every predetermined cycle. Herein, the paging group 14 is constituted of one or more cells. In this case, a cell covered by the base station may belong to plural paging groups. The paging group may also be called a paging area, location area, or location registration area. In the example of FIG. 1, the paging group $14_1$ includes cells covered by the base stations $12_1$, $12_2$, and $12_3$; and paging group $14_2$ includes cells covered by the base stations $12_3$, $12_4$, and $12_5$.

The frames to be used for Paging Announce monitored by the mobile station 18 in idle mode are discontinuously distributed. Therefore, the mobile station 18 in idle mode may reduce its power consumption by stopping receiving data while frames other than the frames to be used for the Paging Announce are transmitted.

As described above, the mobile station 18 in idle mode is not registered to any specific base station. Therefore, it may not be necessary for the mobile station 18 in idle mode to perform a re-registering process even when moving between base stations as long as the mobile station 18 moves within the same paging group. As a result, it may not be necessary for the mobile station 18 to transmit and receive a control message to and from a destination base station.

On the other hand, a case is described when the mobile station 18 in idle mode moves into a different paging group. In this case, the mobile station 18 in idle mode performs a location registration update process with the destination base station. In the location registration update process, the control message is transmitted and received between the mobile station 18 and the base station. As a result, the paging group to which the mobile station 18 belongs is registered to the paging controller/location register (PC/LR) 10.

The paging controller/location register (PC/LR) 10 manages plural base stations 12. Further, the paging controller/location register (PC/LR) 10 manages which mobile station 18 in idle mode belongs to which paging group. Further, the paging controller/location register (PC/LR) 10 is set for each mobile station 18 in a manner such that the paging controller/location register (PC/LR) 10 manages the paging group to which the mobile station 18 belongs. The paging controller/location register (PC/LR) 10 may also be called an Anchor PC/LR for the mobile station 18. In the example of FIG. 1, the Anchor PC/LR for the mobile station 18 is the paging controller/location register (PC/LR) $10_1$. Namely, the Anchor PC/LR is set for each mobile station in idle mode.

The CSN 2 recognizes the Anchor PC/LR for the mobile station 18. Further, the CSN 2 transmits incoming data to the ASN-GW including the Anchor PC/LR. When the Anchor PC/LR included in the ASN-GW receives the incoming data for the mobile station 18 in idle mode, the Anchor PC/LR transmits a Paging Announce to the base stations belonging to the paging group to which the mobile station 18 is registered.

The base station having received the Paging Announce, broadcasts a Paging Message. The Paging Message may also be called MOB_PAG-ADV.

In standard specification, a Paging Announce between the paging controller/location register (PC/LR) 10 and the base station 12 is called the Paging Announce. On the other hand, in standard specification, a Paging Announce between the base station 12 and the mobile station 18 is called the MOB_PAG-ADV.

The mobile station 18 determines that there is traffic to the mobile station 18 based on a Paging Message. Then, the mobile station 18 changes its mode from idle mode to normal mode.

By transmitting and receiving the control message to and from a specific base station, the mobile station 18 is registered to the specific base station. In the example of FIG. 1, the mobile station 18 is registered to the base station $12_3$. As a result, the mobile station 18 establishes downlink and uplink with the specific base station. Herein, the downlink (DL) refers to a link in the direction from the base station to the mobile station, and the uplink (UL) refers to a link from the mobile station to the base station. After establishing the link with the mobile station, the base station transmits the traffic to the base station. By doing in this way, calling (paging) the mobile station is performed.

On the other hand, in IEEE 802.16e, a mobile station in idle mode may receive multicast data without changing its mode from idle mode to normal mode. However, no specific control method thereof is described in IEEE 802.16e.

For example, while the mobile station 18 is in normal mode before changing its mode to idle mode, the mobile station 18 may acquire information items indicating time when desired multicast contents to be received are to be transmitted, Multicast and Broadcast Service Zone Group (MBS Zone Group), and Multicast CID (Connection ID). For example, the mobile station 18 may acquire those information items from any of the multicast server 4, the multicast repeater 8, and the base station 12. Then, after the mobile station 18 has changed its mode to idle mode and when the mobile station 18 is located anywhere in the MBS Zone Group to which the multicast contents are transmitted, from just before the time when the multicast contents are transmitted, the mobile station 18 may start receiving not only the frames to be used for the Paging Announce but also frames for distributing the multicast data.

Herein, the Multicast and Broadcast Service Zone Group (MBS Zone Group) and the Multicast CID are described.

As MBS, IEEE 802.16e prescribes a Single Base Station Multicast and Broadcast Service (Single-BS MBS) and a Multi-Base Station Multicast and Broadcast Service (Multi-BS MBS).

The Multi-BS MBS is described with reference to FIG. 1.

In Multi-BS MBS, the MBS Zone includes plural cells covered by plural base stations. Further, plural base stations covering cells included in the same MBS Zone multicast the same multicast data. The multicast data may be transmitted using, the same subchannel, symbol, modulation, and Multicast CID at the same timing. By doing in this way, a microdiversity effect between the base stations may be obtained. Therefore, the receiving sensitivity of the mobile station may be improved.

In the example of FIG. 1, the MBS Zone $16_1$ includes cells covered by the base stations $12_1$ and $12_2$. Further, the MBS Zone $16_2$ includes cells covered by the base stations $12_2$, $12_3$, and $12_4$. Further, the MBS Zone $16_3$ includes cells covered by the base stations $12_4$ and $12_5$. In this case, a cell covered by a base station may be included in plural MBS Zones. In the example of FIG. 1, the cell covered by the base station $12_2$ is included in the MBS Zones $16_1$ and $16_2$. Further, the cell covered by the base station $12_4$ is included in the MBS Zones $16_2$ and $16_3$.

The base station broadcasts the MBS Zone to which the base station belongs. For example, by using a message called DCD (Downlink Channel Descriptor), the base station periodically and wirelessly broadcasts the MBS Zone to which the base station belongs.

By receiving the DCD periodically broadcast, the mobile station 18 may detect the MBS Zone to which the base station belongs, a downlink signal of the base station being monitored by the mobile station 18. In the example of FIG. 1, the mobile station 18 monitors the downlink signal of the base station $12_3$. Further, the cells covered by the base station $12_3$ are included in the MBS Zone $16_2$. The MBS Zone Group in which multicast contents are transmitted corresponds to a distribution area to which the multicast contents are distributed. When the mobile station 18 is located in the area where desired multicast contents are distributed, the mobile station 18 may perform a receiving process for receiving the multicast data to be desirably received.

Further, when the mobile station 18 already knows the Multicast CID of the multicast data to be desirably received, the mobile station 18 may decode the multicast data in the frames transmitted from the base station 12.

By doing as described above, for example, before changing the mode to idle mode, the mobile station 18 may acquire the information items indicating time when the multicast contents are to be transmitted, MBS Zone Group, and Multicast CID. During idle mode, when the mobile station 18 is located in the MBS Zone where the multicast contents are distributed and the distribution time is come while located in the MBS Zone, the mobile station 18 may receive not only the frames used for the Paging Announce but also other frames which may be necessary for receiving the multicast data. The mobile station 18 may decode the multicast data included in the other frames based on the Multicast CID to receive the multicast data.

On the other hand, regarding the radio base station side apparatus, when the distribution time is come, the multicast server 4 which is a distribution source of the multicast contents transmits the multicast data to the multicast repeater 8 managing the distribution area of the multicast contents. The multicast server 4 transmits the multicast data to the multicast repeater $8_1$ managing the distribution area of the multicast contents such as the MBS Zone $16_2$. Then, the multicast repeater $8_1$ transmits the multicast data to the base stations $12_2$, $12_3$, and $12_4$ covering the cells included in the MBS Zone $16_2$. Then, the base stations $12_2$, $12_3$, and $12_4$ transmit the multicast data in synchronization with each other as described above. By transmitting in this way, a micro diversity effect between base stations may be obtained.

The multicast repeaters 8 managing the MBS zones may be set in advance. In the example of FIG. 1, a case is described where the MBS Zones $16_1$, $16_2$, and $16_3$ are managed by the repeaters $8_1$, $8_1$, and $8_2$, respectively.

Further, in Single-BS MBS, unlike Multi-BS MBS, to obtain the micro diversity effect between base stations, the same multicast data are not multicasted using the same subchannel, symbol, modulation, and multicast CID at the same timing. Except for this point, basically, Single-BS MBS is similar to Multi-BS MBS. Therefore, in Single-BS MBS, the micro diversity effect between base stations may not be obtained.

Upon receiving the multicast data, it may not be necessary for the mobile station 18 to establish a link with a specific base station. As described above, as long as the mobile station 18 knows the information items indicating time when the multicast contents are to be transmitted, MBS Zone Group, and Multicast CID, the mobile station 18 may receive the multicast data. In other words, in a case where the mobile station does not know the time when the multicast contents are to be transmitted and the MBS Zone Group, when the mobile station knows the Multicast CID, the mobile station may receive the multicast data. However, in this case, it may become necessary for the mobile station to perform the receiving process even when the multicast data are not transmitted. Further, in this case, it may become necessary for the mobile station to perform the receiving process even when the mobile station is located in the areas other than the area where multicast contents are distributed. However, it is similar to idle mode in that it may not be necessary to establish a link between the mobile station 18 and a specific base station 12.

The mobile station 18 in idle mode can hardly receive the effect of reducing the power consumption while receiving the multicast data. However, the mobile station 18 in idle mode may receive multicast data at least without changing its mode to normal mode. Therefore, it may not be necessary for the mobile station 18 in idle mode to transmit/receive a control message to and from a specific base station in order to receive multicast data.

While a mobile station in idle mode is receiving multicast, the mobile station may not transmit data to the base station 12. However, purposes of data transmission from the mobile station in idle mode to the base station while the the mobile station in idle mode is receiving the multicast are supposed to be as follows;

1. To transmit Acknowledgement (ACK) which may be required to be transmitted depending on the multicast service;
2. To transmit Received radio wave quality (received quality) to be transmitted to adaptively modulate a Paging Message to be received by the mobile station in idle mode; and
3. To transmit Received radio wave quality (received quality) to be transmitted to adaptively modulate multicast data of the MBS to be received by a mobile station in idle mode.

Herein, the Paging Message may be called MOB_PAG-ADV. The received quality may include a Channel Quality Indication (CQI). Further, regarding the above-described data transmitted from the mobile station in idle mode, the amount of data may have been determined. Further, regarding the above-described data transmitted from the mobile station in idle mode, the data may be temporarily transmitted.

The transmission of the Acknowledgement may be an essential function for some multicast services. In current IEEE 802.16e specification, when transmitting the Acknowledgement, the mobile station is required to perform the following operations. The mobile station transmits and receives control messages to and from a specific base station. Further, the mobile station changes its mode from idle mode to normal mode. After that, the mobile station transmits the Acknowledgement to the radio base station side apparatus.

The transmission of the received quality is not an essential function for a mobile station in idle mode. However, when the mobile station in idle mode receives multicast data, the effect of reducing the power consumption that can be received due to idle mode may be reduced. In other words, when the mobile station in idle mode receives multicast data, the power is consumed. Therefore, the mobile station which is in idle mode does consume power. When the information item indicating the above-described received quality is transmitted, there may be no disadvantage (demerit) of the power consumption caused by the above transmission. This is because the base station 12 may perform adaptive modulation based on the received quality transmitted from the mobile station 18. Therefore, there arises a merit to be able to perform the adaptive modulation. For example, by performing the adaptive modulation, the base station 12 may reduce the number of symbols which may be necessary for the transmission.

Further, the mobile station 18 transmits the received quality. The base station 12 optimizes the modulation based on the received quality. Namely, the base station 12 performs a so-called adaptive modulation. The base station 12 may apply a result of the adaptive modulation to all the downlink data to be received by the mobile station 18. However, besides the control information for decoding frames such as the header of the frames, the downlink data received by the mobile station 18 in idle mode are limited to the Paging Message and the multicast data. Therefore, the effect caused by transmitting the received radio wave quality (received quality) to the radio base station side apparatus may be eventually limited to the above-described cases 2 and 3. However, there is a merit of providing temporary uplink for the mobile station 18 in idle mode.

However, in the current IEEE 802.16e specification, even when uplink data are temporarily required to be transmitted, the mobile station 18 may have to transmit and receive control messages to and from a specific base station 12 and change its mode from idle mode to normal mode.

In a case where an amount of data to be transmitted from the mobile station 18 to the base station 12 has not been determined, it is preferable to perform the following processes. The mobile station 18 transmits and receives control messages to and from the base station 12 and changes its mode from idle mode to normal mode. The mobile station 18 in normal mode establishes a link with the base station 12, and then transmits necessary data to the base station 12. This is because, since the amount of data has not been determined, the mobile station 18 may be required to use the control message to continually send a request for a bandwidth which may be necessary to transmit the amount of data to the base station 12. In this case, the mobile station 18 may use the control message to send a request to the base station 12 so that a bandwidth allowing a certain amount of fixed throughput can be periodically allocated. As a matter of practice, these processes are equivalent to the processes of establishing a link. The data transmitted in the processes are not included in the temporary uplink.

As described above, in the current IEEE 802.16e specification, when the mobile station 18 in idle mode receiving the multicast data transmits temporary uplink data having a determined data amount, the mobile station 18 may be required to transmit and receive the control messages to and from a specific base station 12 and change its mode from idle mode to normal mode.

Therefore, the mobile station 18 in idle mode receiving the multicast data may not transmit uplink data for the following purposes:

1. To transmit Acknowledgement (ACK) which may be required to be transmitted depending on the multicast service;
2. To transmit Received radio wave quality (received quality) to be transmitted to adaptively modulate a Paging Message to be received by the mobile station in idle mode; and
3. To transmit Received radio wave quality (received quality) to be transmitted to adaptively modulate multicast data of the MBS to be received by a mobile station in idle mode.

Herein, the Paging Message may be called MOB_PAG-ADV. The received quality may include a Channel Quality Indication (CQI). Further, regarding the above-described data transmitted from the mobile station in idle mode, the amount of data may have been determined. Further, regarding the above-described data transmitted from the mobile station in idle mode, the data may be temporarily transmitted.

A radio base station apparatus, a mobile station, a communication system, and a method according to an embodiment of the present invention are made in light of the above-described problems. The present invention may provide a radio base station apparatus, a mobile station, a communication system, and a method allowing the transmission of uplink data during idle mode.

In the following, best modes to carry out the present invention are described based on the following embodiments with reference to the accompanying drawings.

In all the drawings illustrating the embodiments of the present invention, the same numerals are used for the elements having the same functions, and repeated description thereof may be omitted.

Exemplary Configuration of Communication System

Figure 2:
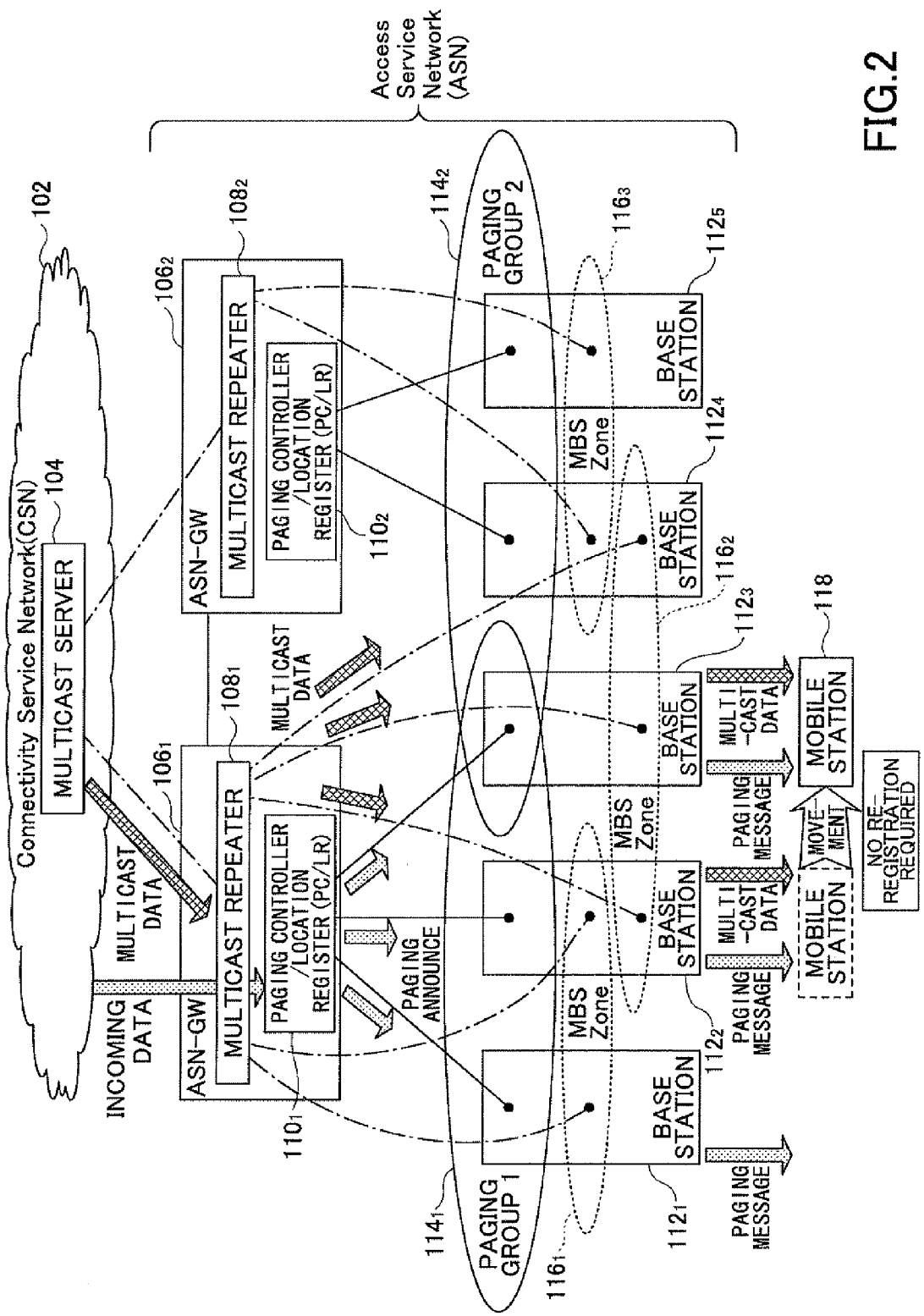
FIG. 2 is a drawing illustrating a communication system according to an embodiment of the present invention.

A communication system according to an embodiment of the present invention is described with reference to FIG. 2.

The communication system according to this embodiment of the present invention includes a mobile station 118. Further, the communication system according to this embodiment of the present invention includes a base station (BS) 112. Further, the communication system according to this embodiment of the present invention includes paging controllers/location registers (PC/LR) 110. Further, the communication system according to this embodiment of the present invention includes multicast repeaters 108. Further, the communication system according to this embodiment of the present invention includes a multicast server 104. In FIG. 2, only one mobile station is depicted. However, the number of the mobile stations may be more than one. In FIG. 2, five base stations are depicted. However, the number of the base stations may be less than five or more than five. In FIG. 2, two paging controllers/location registers (PC/LR) are depicted. However, the number of the paging controllers/location registers (PC/LR) may be one or more than two. In FIG. 2, one multicast server is depicted. However, the number of the multicast server may be more than one.

A communication system according to this embodiment of the present invention supports a discontinuous reception scheme. Herein, in the discontinuous reception scheme, idle mode and paging are provided.

Further, the communication system according to this embodiment of the present invention supports a multicast distribution scheme. Herein, in the multicast distribution scheme, Multicast and Broadcast Service (MBS) is provided. The MBS may also be called Multicast Broadcast Service (MCBCS).

In the following, the base station 112, paging controllers/location register (PC/LR) 110, multicast repeater 108, and multicast server 104 are collectively called a radio base station side apparatus.

The communication system includes a Connectivity Service Network (CSN) 102. Further, the communication system includes an Access Service Network (ASN).

The CSN 102 includes the multicast server 104. The ASN includes an Access Service Network-Gateway (ASN-GW) 106. The ASN-GW 106 includes the multicast repeater 108. Further, the ASN-GW 106 includes the paging controllers/location register (PC/LR) 110. Further, the ASN includes the base station 112.

The mobile station 118 in idle mode is not registered to a specific base station. The mobile station 118 in idle mode monitors Paging Message periodically transmitted from all the base stations 112 included in a paging group 114. Further, the mobile station 118 in idle mode determines whether there is traffic to the mobile station 118 every predetermined cycle. Herein, the paging group is a group constituted of one or more cells. A cell covered by the base station may belong to plural paging groups. The paging group may also be called a paging area, location area, or location registration area. In the example of FIG. 2, the paging group $114_1$ includes cells covered by the base stations $112_1$, $112_2$, and $112_3$; and paging group $114_2$ includes cells covered by the base stations $112_3$, $112_4$, and $112_5$.

In the communication system according to this embodiment of the present invention, the radio base station side apparatus receives multicast data. Further, the radio base station side apparatus searches for the mobile station in idle mode. Further, the radio base station side apparatus searches for the mobile station that receives the received multicast data from among the mobile stations in idle mode. Further, the radio base station side apparatus searches for the paging group where the mobile station in idle mode is located, the mobile station receiving the multicast data. Further, when the paging group overlaps a distribution area of the multicast data, in the radio base station side apparatus, a group of the base stations belonging to the distribution area transmits the multicast data. In this case, a radio frame including the multicast data includes a band allocation message.

The mobile station in idle mode receiving the multicast transmits uplink data by using the band included in the band allocation message. The uplink data may be a data having a determined data amount. Further, the data may be a data to be temporarily transmitted.

Figure 3:
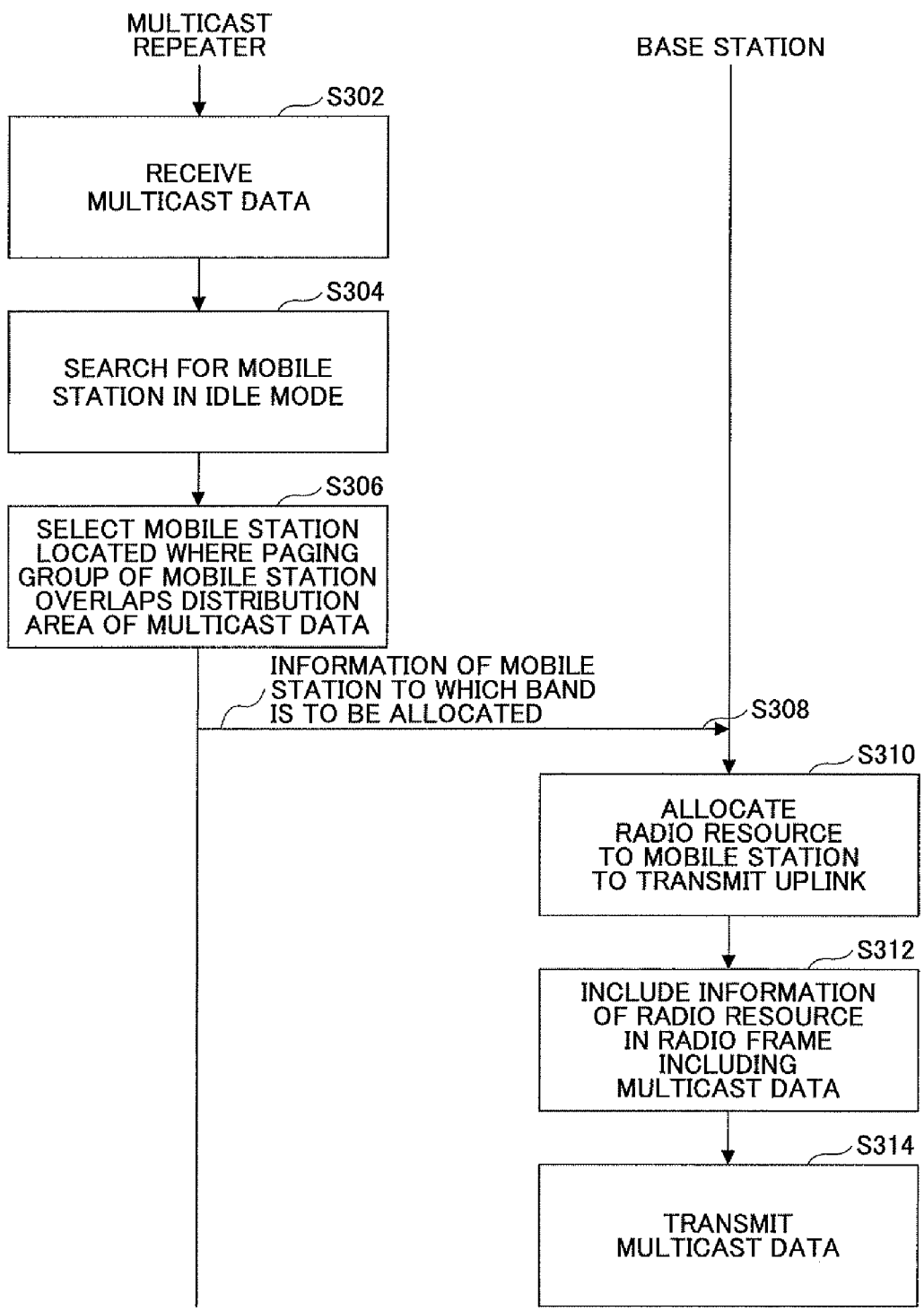
FIG. 3 is a flowchart illustrating operations of a communication system according an embodiment of the present invention.

Operations of the communication system according to this embodiment of the present invention are described with reference to FIG. 3.

The multicast repeater 108 receives multicast data from the multicast server 104 (step S302).

The multicast repeater 108 searches for the mobile station in idle mode from among the mobile stations receiving the multicast data (step S304).

From among the searched-for mobile stations in idle mode, the multicast repeater 108 selects the mobile station located in an area where the paging group where the mobile station is located overlaps the area where the multicast data are distributed (step S306).

The multicast repeater 108 transmits the information indicating the mobile station selected in step S306 to the base station 112 (step S308).

Based on the received information indicating the selected mobile station, the base station 112 allocates radio resources allowing the selected mobile station to transmit an uplink signal (step S310).

The base station 112 includes the information indicating the radio resources allocated in step S310 in the radio frames used for transmitting the multicast data to the selected mobile station (step S312).

The base station 112 transmits the multicast data (step S314).

According to this embodiment of the present invention, the mobile station in idle mode receiving the multicast may transmit a temporary uplink data having a determined data amount. In this case, it may not be necessary for the mobile station to transmit and receive data to and from a specific base station and change its mode from idle mode to normal mode.

In this embodiment of the present invention, by receiving the band allocation message, the mobile station in idle mode receiving the multicast may use the band allocated to the mobile station to transmit the Acknowledgement (ACK) of the multicast data to the radio base station side apparatus.

In this embodiment of the present invention, by receiving the band allocation message, the mobile station in idle mode receiving the multicast may use the band allocated to the mobile station to transmit the received radio wave quality (received quality) to the radio base station side apparatus. In this case, when receiving the incoming data to the mobile station, the radio base station side apparatus having received the received radio wave quality (received quality) broadcasts the Paging Message adaptively modulated based on the received quality to the mobile station.

In this embodiment of the present invention, by receiving the band allocation message, the mobile station in idle mode receiving the multicast may use the band allocated to the mobile station to transmit the received radio wave quality (received quality) to the radio base station side apparatus. In this case, when transmitting the MBS multicast data, the radio base station side apparatus having received the received radio wave quality (received quality) searches for the mobile station in idle mode having not obtained effective received quality from among the mobile stations in idle mode located in an MBS Zone included in a distribution area of the multicast data. Then, the radio base station side apparatus determines whether the bands have been allocated to all the searched-for mobile stations in idle mode having not obtained effective received quality by the distribution of the multicast data in the MBS zone. Then, when determining that the bands have been allocated to all the searched-for mobile stations in idle mode having not obtained effective received quality, the radio base station side apparatus adaptively modulates the multicast data to be distributed in the MBS Zone based on the minimum received quality of the the mobile stations in idle mode having obtained effective received quality and/or the mobile stations in normal mode having obtained effective received quality.

First Embodiment

A communication system according to this embodiment of the present invention is described with reference to FIG. 4.

Figure 4:
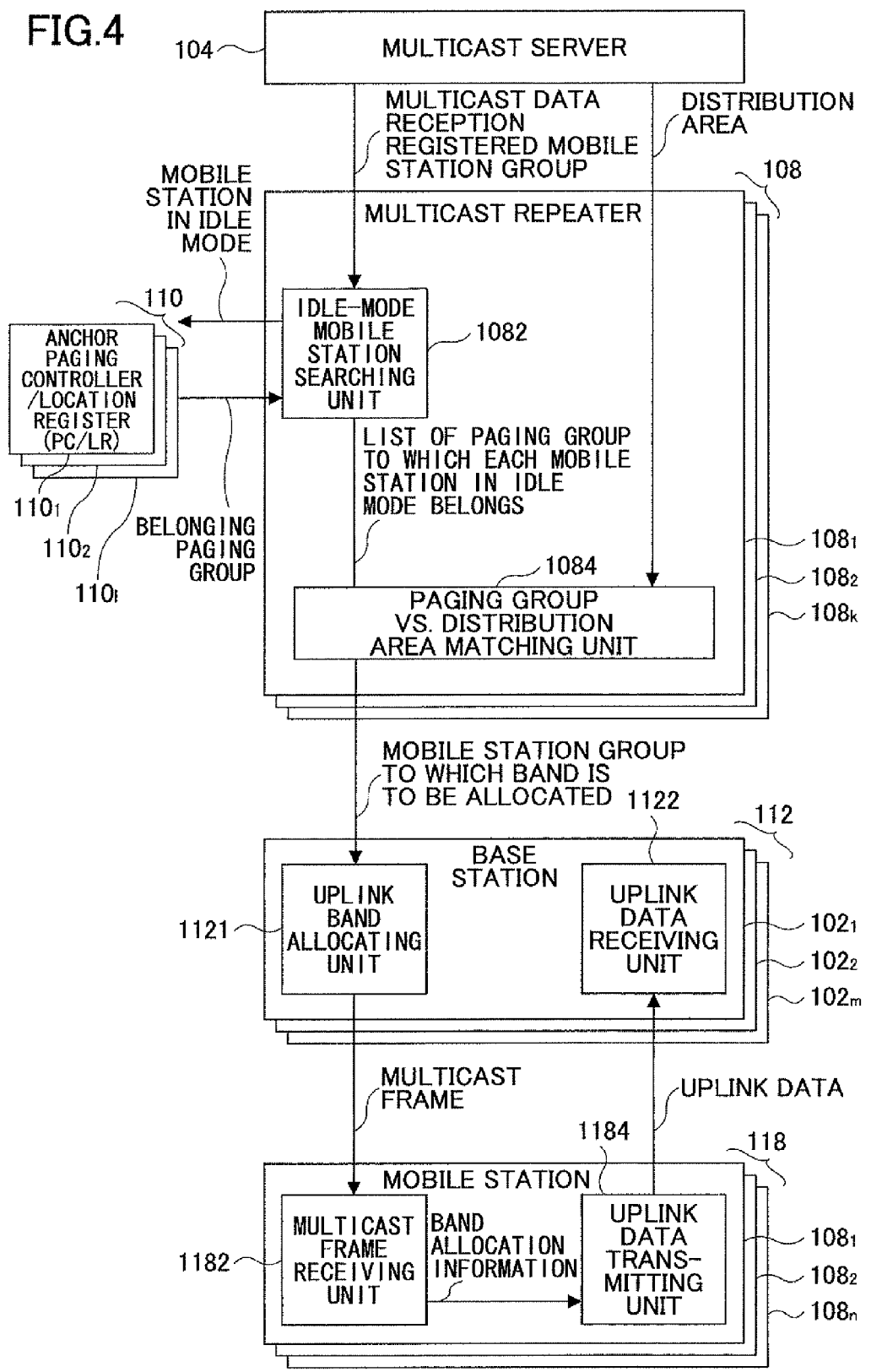
FIG. 4 is a partial block diagram illustrating a communication system according an embodiment of the present invention.

In FIG. 4, the communication system includes the multicast server 104, the multicast repeaters 108 ($108_1$, $108_2$, ..., $108_k$) (k: an integer greater than zero), the Anchor page controller/location register (PC/LR) 110 ($110_1$, $110_2$, ..., $110_l$) (l: an integer greater than zero), the base stations 112 ($112_1$, $112_2$, ..., $112_m$) (m: an integer greater than zero), and the mobile stations 118 ($118_1$, $118_2$, ..., $118_n$) (n: an integer greater than zero). The multicast repeaters 108 and the Anchor page controller/location register (PC/LR) 110 may be included in the same ASN-GW. Otherwise, the multicast repeaters 108 and the Anchor page controller/location register (PC/LR) 110 may be included in different ASN-GWs.

The multicast repeater 108 includes an idle-mode mobile station searching unit 1082. Further, the multicast repeater 108 includes a paging group vs. distribution area matching unit 1084.

The base station 112 includes an uplink band allocating unit 1121. Further, the base station 112 includes an uplink data receiving unit 1122.

The mobile station 118 includes a multicast frame receiving unit 1182. Further, the mobile station 118 includes an uplink data transmitting unit 1184.

The multicast server 104 distributes multicast contents to be distributed based on the distribution time to the multicast repeater 108 managing a destination MBS Zone of the multicast contents. In this case, the number of the destination MBS Zone of the multicast contents may be one or more than one.

The multicast server 104 transmits the information indicating the mobile stations having been registered to receive the multicast contents (herein after referred to as "multicast data reception registered mobile station group") to the multicast repeater 108. The number of mobile stations having been registered to receive the multicast contents may be one or more than one. Further, the multicast server 104 transmits the information indicating the distribution area of the multicast contents to the multicast repeater 108. Herein, the distribution area of the multicast contents corresponds to the destination MBS Zone.

The information indicating the multicast data reception registered mobile station group may be transmitted to the multicast repeater 108 before the multicast data are transmitted. Further, the information indicating the distribution area of the multicast contents may be transmitted to the multicast repeater 108 before the multicast data are transmitted. Further, when the multicast repeater managing the MBS Zone differs for each MBS Zone, the number of the destination multicast repeaters 108 becomes more than one.

The idle-mode mobile station searching unit 1082 searches for the mobile stations in idle mode from among the mobile stations included in the multicast data reception registered mobile station group based on the information indicating the multicast data reception registered mobile station group transmitted from the multicast server 104. Then, the idle-mode mobile station searching unit 1082 asks the Anchor page controller/location register (PC/LR) 110 of the mobile station in idle mode about the paging group to which the searched-for mobile station in idle mode belongs. When there are different Anchor page controller/location registers (PC/LR) 110 for each mobile station in idle mode, the idle-mode mobile station searching unit 1082 asks the Anchor page controller/location registers (PC/LR) 110 corresponding to the mobile stations in idle mode about the paging groups to which the mobile stations in idle mode belong.

The idle-mode mobile station searching unit 1082 associates each mobile station in idle mode with the paging group, and makes a list based on the acquired paging group to which each mobile station in idle mode belongs. Then, the idle-mode mobile station searching unit 1082 inputs the list in the paging group vs. distribution area matching unit 1084.

The information indicating the distribution area of the multicast contents transmitted from the multicast server 104 is input in the paging group vs. distribution area matching unit 1084. By matching between the list input by the idle-mode mobile station searching unit 1082 and the distribution area, the paging group vs. distribution area matching unit 1084 specifies the mobile station to which a band is to be allocated. For example, when at least one of the base stations covering the cells included in the paging group to which a mobile station in idle mode belongs corresponds with the base station belonging to the MBS Zone which is the distribution area, the paging group vs. distribution area matching unit 1084 determines that a band is to be allocated to the mobile station in idle mode.

By doing in this way, the paging group vs. distribution area matching unit 1084 may specify the mobile station to which a band is to be allocated for each MBS Zone managed by the multicast repeater 108. The paging group vs. distribution area matching unit 1084 transmits the information indicating the mobile station to which a band is to be allocated to the base station belonging to the MBS Zone managed by the multicast repeater 108.

In the base station 112, based on the information indicating the mobile station to which a band is to be allocated transmitted from the multicast repeater 108, the uplink band allocating unit 1121 includes the band allocation message in the radio frames including the multicast data to be transmitted to the mobile station. The band allocation message is used so that the mobile station transmits the temporary uplink data having a determined data amount.

In the mobile station 118 in idle mode having received the multicast data, the multicast frame receiving unit 1182 extracts the band allocation message included in the multicast frame. Then, the multicast frame receiving unit 1182 inputs the extracted band allocation message in the uplink data transmitting unit 1184.

Based on the input band allocation message, by using the band allocated to the mobile station 118, the uplink data transmitting unit 1184 transmits uplink data to the base station 112 covering the area where the mobile station 118 is located.

In the base station 112 covering the area where the mobile station 118 is located, the uplink data receiving unit 1122 receives the uplink data. The base station 112 performs processes based on the received uplink data.

According to this embodiment of the present invention, the radio base station side apparatus receives multicast data. Further, the radio base station side apparatus searches for the mobile stations in idle mode from among the mobile stations having been registered to receive the multicast data. Further, the radio base station side apparatus searches for the paging group where the mobile station in idle mode is located. Further, in the radio base station side apparatus, when the paging group where the mobile station in idle mode is located overlaps the area where the received multicast data are distributed, the base station belonging to the distribution area transmits the multicast data. When transmitting the multicast data, the radio base station side apparatus may include the band allocation message in the radio frames including the multicast data.

Second Embodiment

Figure 5:
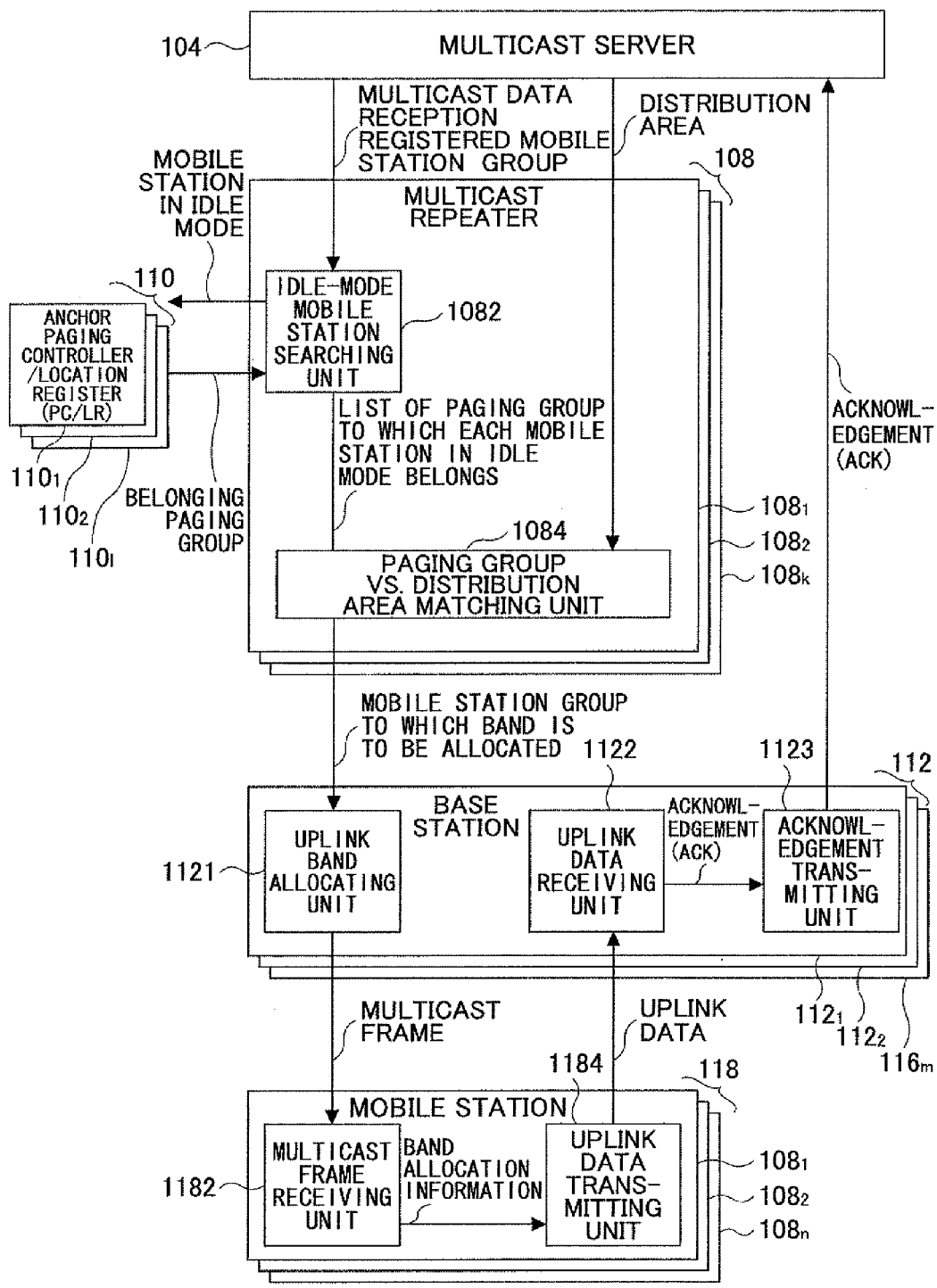
FIG. 5 is a partial block diagram illustrating a communication system according an embodiment of the present invention.

In a communication system according to this embodiment of the present invention, a case is described where the uplink signal is Acknowledgement (ACK) with reference to FIG. 5.

This communication system differs from the communication system described with reference to FIG. 4 in that the uplink data transmitting unit 1184 of the mobile station 118 transmits the Acknowledgement (ACK) of the multicast data as the uplink signal. Further, this communication system differs from the communication system described with reference to FIG. 4 in that the base station 112 includes an acknowledgement transmitting unit 1123. In this communication system, the uplink data receiving unit 1122 extracts the Acknowledgement (ACK) of the multicast data included in the uplink signal transmitted by the mobile station 118. Then, the uplink data receiving unit 1122 inputs the extracted Acknowledgement (ACK) in the acknowledgement transmitting unit 1123. The acknowledgement transmitting unit 1123 transmits the Acknowledgement (ACK) input by the uplink data receiving unit 1122 to the multicast server 104.

The acknowledgement transmitting unit 1123 may transmit the Acknowledgement (ACK) to the multicast repeater 108. In this case, the multicast repeater 108 transmits the received Acknowledgement (ACK) to the multicast server 104. In other words, the multicast repeater 108 relays the received Acknowledgement (ACK) to the multicast server 104.

By doing in this way, the mobile station in idle mode receiving the multicast data may transmit the Acknowledgement (ACK) of the multicast data to the radio base station side apparatus by using the band for transmitting the uplink data, the band having been allocated to the mobile station in the band allocation message.

Third Embodiment

Figure 6:
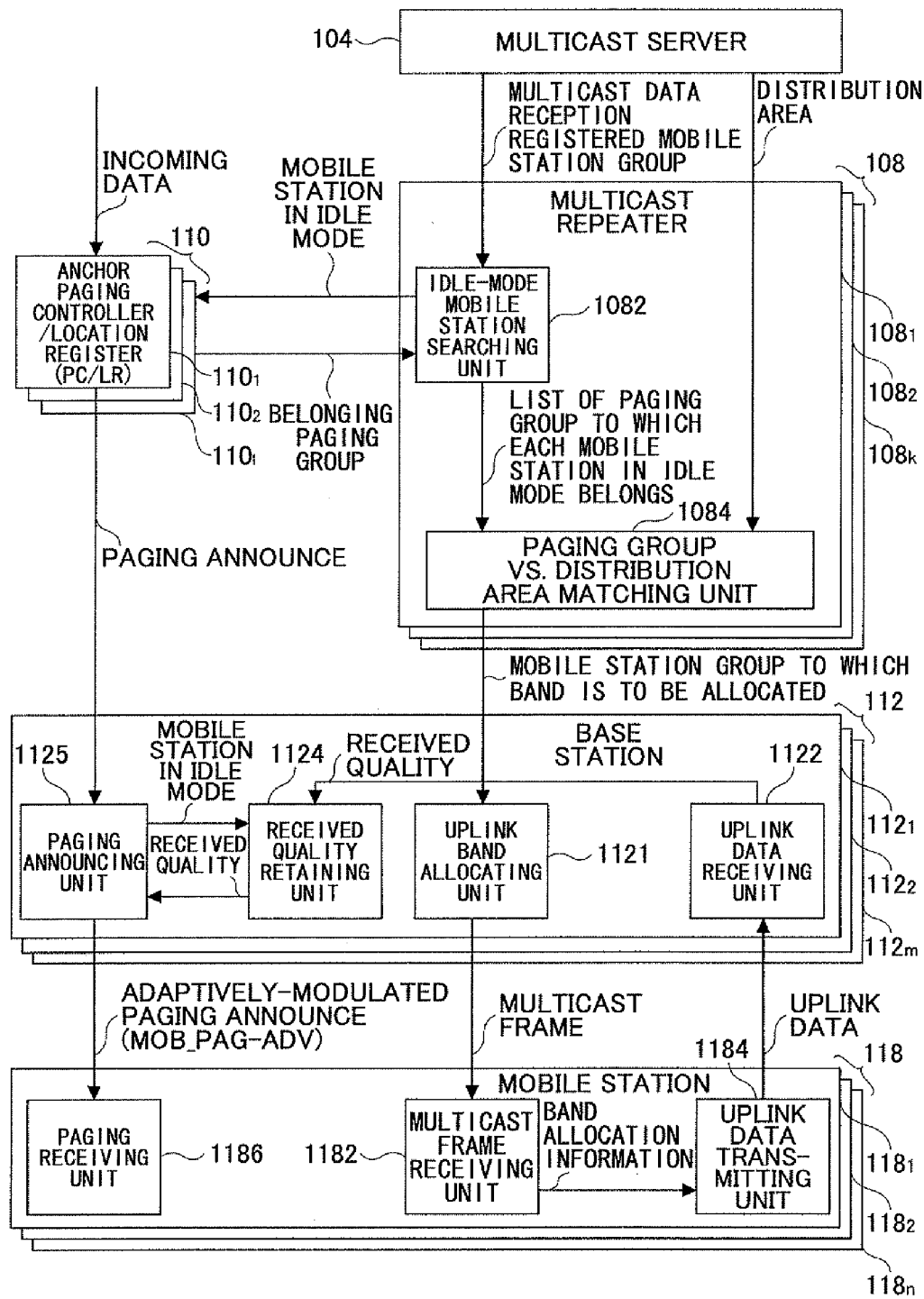
FIG. 6 is a partial block diagram illustrating a communication system according an embodiment of the present invention.

In a communication system according to this embodiment of the present invention, a case is described where an adaptive modulation is applied to the Paging Announce with reference to FIG. 6.

This communication system differs from the communication system described with reference to FIG. 4 in that the base station 112 includes a received quality retaining unit 1124. Further, this communication system differs from the communication system described with reference to FIG. 4 in that the base station 112 includes a paging announcing unit 1125. Further, this communication system differs from the communication system described with reference to FIG. 4 in that the mobile station 118 includes a paging receiving unit 1186.

As the uplink signal, the uplink data transmitting unit 1184 transmits the received radio wave quality (received quality) in downlink of the mobile station 118 to the base station 112. The uplink data receiving unit 1122 of the base station 112 extracts the received quality included in the uplink data transmitted from the mobile station 118. The uplink data receiving unit 1122 inputs the extracted received quality in the received quality retaining unit 1124. The received quality retaining unit 1124 retains the received quality of each mobile station. The received quality retaining unit 1124 may retain the received quality until its expiration time.

Further, the Anchor page controller/location registers (PC/LR) 110 receives incoming data. The Anchor page controller/location registers (PC/LR) 110 having received the incoming data transmits the Paging Announce to the base station belonging to the paging group where the mobile station in idle mode is located, the mobile station being the destination of the incoming data.

In the base station 112 having received the Paging Announce, the paging announcing unit 1125 asks the received quality retaining unit 1124 about the received quality of the mobile station in idle mode to be paged. When acquiring the received quality corresponding to the mobile station in idle mode to be paged, based on the received quality, the paging announcing unit 1125 adaptively modulates and broadcasts the Paging Announce to the mobile station in idle mode. The the Paging Announce may be called MOB_PAG-ADV. In the mobile station 118, the paging receiving unit 1186 receives the Paging Announce. Based on the received Paging Announce, the mobile station 118 performs incoming processes.

By doing in this way, the mobile station in idle mode receiving the multicast data may transmit the received radio wave quality (received quality) to the radio base station side apparatus by using the band allocated to the mobile station by receiving the band allocation message. Therefore, when receiving the incoming data to the mobile station, the radio base station side apparatus may broadcast adaptively modulated Paging Message based on the received quality to the mobile station.

Fourth Embodiment

Figure 7:
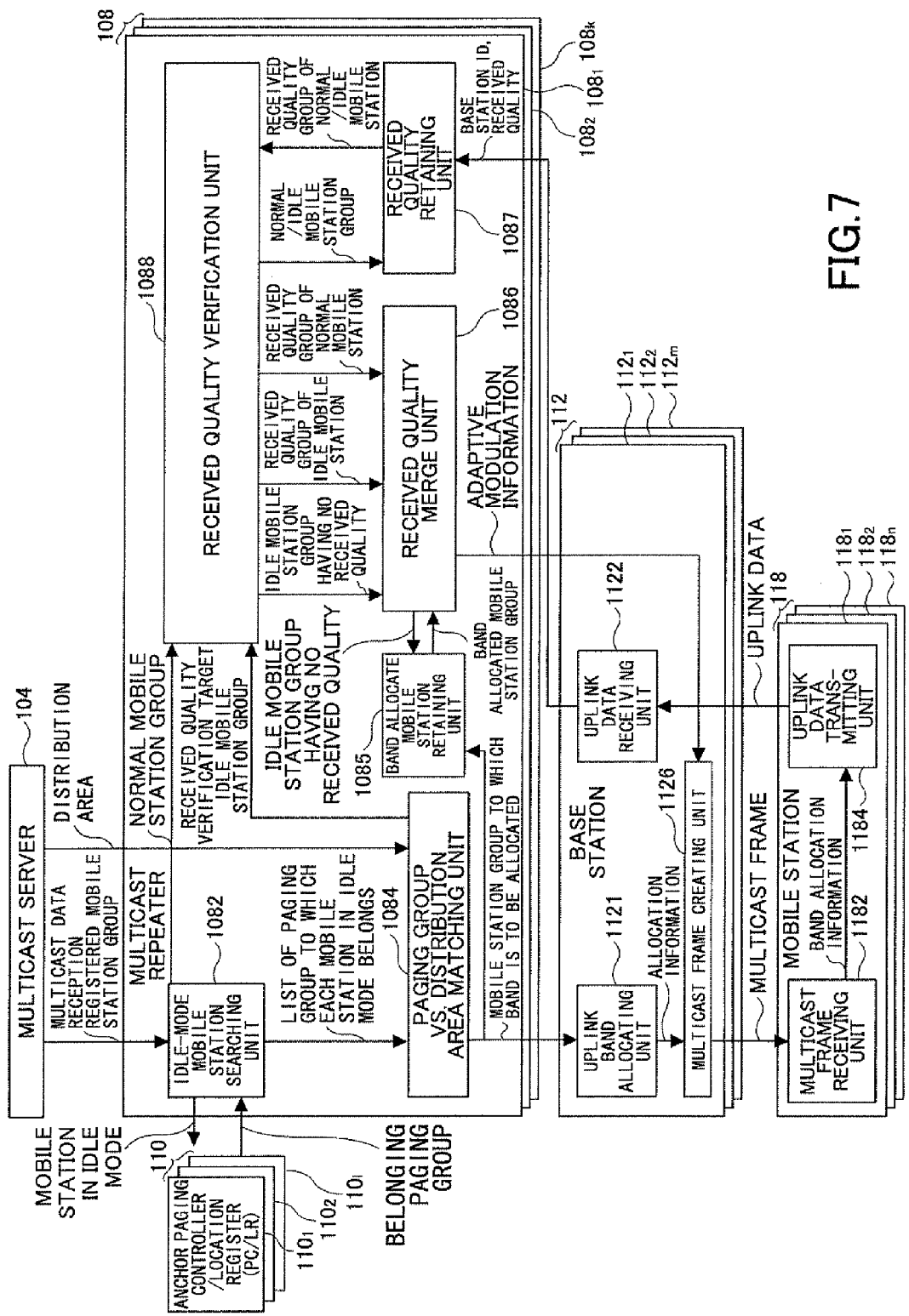
FIG. 7 is a partial block diagram illustrating a communication system according an embodiment of the present invention.

In a communication system according to this embodiment of the present invention, a case is described where an adaptive modulation is applied to the multicast data with reference to FIG. 7.

This communication system differs from the communication system described with reference to FIG. 4 in that the base station 112 includes a multicast frame creating unit 1126. Further, this communication system differs from the communication system described with reference to FIG. 4 in that the multicast repeater 108 includes a band allocated mobile station retaining unit 1085. Further, this communication system differs from the communication system described with reference to FIG. 4 in that the multicast repeater 108 includes a received quality merge unit 1086. Further, this communication system differs from the communication system described with reference to FIG. 4 in that the multicast repeater 108 includes a received quality retaining unit 1087. Further, this communication system differs from the communication system described with reference to FIG. 4 in that the multicast repeater 108 includes a received quality verification unit 1088.

As the uplink signal, the uplink data transmitting unit 1184 transmits the received radio wave quality (received quality) in downlink of the mobile station 118 to the base station 112. The uplink data receiving unit 1122 of the base station 112 transmits the received quality and an ID of the base station to all the multicast repeaters 108 managing the MBS Zone to which the mobile station 118 belongs. In this case, the number of the MBS Zone to which the base station 112 belongs may be more than one.

The received quality and the ID of the base station (base station ID) transmitted from the base station 112 are input to the received quality retaining unit 1087 of the multicast repeater 108. The received quality retaining unit 1087 associates and retains the input base station ID with the respective received quality. For example, the received quality retaining unit 1087 may retain the base station ID and the respective received quality as a pair. Further, the received quality retaining unit 1087 may retain the base station ID and the respective received quality until their expiration time.

The paging group vs. distribution area matching unit 1084 specifies the mobile station to which a band is to be allocated (hereinafter referred to as a "band allocation target mobile station group"). The number of the band allocation target mobile stations may be more than one. The paging group vs. distribution area matching unit 1084 transmits the information indicating the specified band allocation target mobile station group to the base station 112. Further, the paging group vs. distribution area matching unit 1084 inputs the specified band allocation target mobile station group in the band allocated mobile station retaining unit 1085. Further, the paging group vs. distribution area matching unit 1084 inputs the information indicating the MBS Zone to be allocated in the band allocated mobile station retaining unit 1085. The band allocated mobile station retaining unit 1085 may retain the input information until its expiration time.

A case is described where the MBS multicast data is transmitted.

In the multicast repeater 108, the idle-mode mobile station searching unit 1082 specifies the paging group to which the mobile station in idle mode belongs for each mobile station in idle mode. Further, the idle-mode mobile station searching unit 1082 specifies a mobile station in normal mode (hereinafter referred to as a "normal mobile station group"). In this case, the number of the mobile stations in normal mode may be more than one. Then, the idle-mode mobile station searching unit 1082 inputs the normal mobile station group in the received quality verification unit 1088. For example, the idle-mode mobile station searching unit 1082 may specify the mobile station in normal mode by searching for the mobile station not belonging to any paging group from among the mobile stations included in the multicast data reception registered mobile station group. When this specifying method is used, to be more exact, a mobile station not registered to the network may be included in the specified normal mobile station group. The mobile station not registered to the network includes, for example, a mobile station being turned OFF.

Further, the paging group vs. distribution area matching unit 1084 inputs a group of mobile stations in idle mode having received quality to be verified (hereinafter referred to as a "received quality verification target idle mobile station group") in the received quality verification unit 1088. For example, the paging group vs. distribution area matching unit 1084 may specify the received quality verification target idle mobile station group by performing processes similar to the processes of specifying the mobile station to which a band is to be allocated. By performing the processes, the mobile station in idle mode which may be located in target MBS Zone may be specified from a group of mobile stations in idle mode receiving the multicast.

The received quality verification unit 1088 asks the received quality retaining unit 1087 about the received quality of the normal mobile station group and the received quality of the received quality verification target idle mobile station group. Then, the received quality verification unit 1088 specifies a received quality group of the normal mobile station group, a received quality group of the received quality verification target idle mobile station group, and a group of the mobile stations in idle mode having no received quality. The received quality verification unit 1088 inputs the specified the received quality group of the normal mobile station group, the received quality group of the received quality verification target idle mobile station group, and the group of the mobile stations in idle mode having no received quality in the received quality merge unit 1086.

For example, when specifying the received quality group of the normal mobile station group, the received quality verification unit 1088 specifies the normal mobile station group having the received quality information in the base station belonging to the target MBS Zone from among the group of mobile stations in normal mode. Then, the received quality verification unit 1088 inputs the received quality of the specified mobile station in the received quality merge unit 1086 as the received quality group of the normal mobile station group. Further, the received quality verification unit 1088 may exclude the mobile stations in normal mode (normal mobile stations) having the received quality information in the base station not belonging to the target MBS Zone. This is because it may not be necessary in considering the adaptive modulation of the multicast data distributed to the target MBS Zone. Further, the received quality verification unit 1088 may exclude the normal mobile stations having no received quality information. This is because that the normal mobile station having no received quality information may belong to the MBS Zone not managed by the multicast repeater or may be the mobile station not registered to the network, and therefore, it may not be necessary in considering the adaptive modulation of the multicast data distributed to the target MBS Zone. By doing in this way, a problem may not occur because, even when the mobile station not registered to the network in the specified normal mobile station group is included, the mobile station may be excluded in this process.

Further, the received quality verification unit 1088 specifies the received quality verification target idle mobile station group having the received quality information in the base station belonging to the target MBS Zone from among the received quality verification target idle mobile station group.

Then, the received quality verification unit 1088 inputs the received quality of the specified mobile station in the received quality merge unit 1086 as the idle mobile station received quality group.

Further, the received quality verification unit 1088 may exclude the received quality verification target idle mobile station group having the received quality information in the base station not belonging to the target MBS Zone. This is because it may not be necessary in considering the adaptive modulation of the multicast data to be distributed to the target MBS Zone.

Further, the received quality verification unit 1088 may transmit the information of the received quality verification target idle mobile station group having no received quality information to the received quality merge unit 1086 as mobile station group having no received quality, so as to be categorized by the received quality merge unit 1086.

Regarding the mobile station group having no received quality, the received quality merge unit 1086 asks the band allocated mobile station retaining unit 1085 whether an uplink band has been allocated in the past to the mobile station group having no received quality by the distribution of the multicast data to the target MBS Zone. When determining that there is even one mobile station in idle mode to which the band has not been allocated, the mobile station in idle mode has not had an opportunity to respond to the received quality. In this case, the received quality merge unit 1086 determines not to perform the adaptive modulation. In this case, the received quality merge unit 1086 transmits a predetermined fixed modulation information to the base station 112.

On the other hand, when the uplink bands have been allocated to all the mobile stations in idle mode by the distribution of the multicast data to the target MBS Zone, there is no response of received quality though the bands have been allocated. In this case, all the mobile station group having no received quality is not in the target MBS Zone.

In this embodiment of the present invention, when specifying the mobile station group having no received quality, further search is performed depending on whether the mobile station belongs to the paging group overlapping the target MBS Zone. However, similar to the relationship between the paging group $114_1$ and the MBS Zone $116_2$ in the communication system described with reference to FIG. 2, there may be a case where the range of the paging group does not correspond to the range of the MBS Zone. Therefore, even when a band is allocated, there may be a case where a response of the received quality is not acquired from an idle mobile station.

When determining that all the mobile station group having no received quality is not in the target MBS Zone, the received quality merge unit 1086 determines the adaptive modulation based on the received quality group corresponding to the normal mobile station group and the receiving quality group corresponding to the idle mobile station group, and transmits the adaptive modulation information indicating the adaptive modulation to all the base stations belonging to the target MBS Zone. For example, the received quality merge unit 1086 may determine the adaptive modulation information based on the received quality group corresponding to the normal mobile station group and the receiving quality group corresponding to the idle mobile station group and based on the minimum received quality of the received quality group, and transmit the adaptive modulation information to all the base stations belonging to the target MBS Zone.

The adaptive modulation information transmitted from the multicast repeater 108 is input in the multicast frame creating unit 1126 of the base station 112.

Based on the input adaptive modulation information, the multicast frame creating unit 1126 of the base station 112 adaptively modulates and multicasts the multicast frames including the band allocation message.

By doing in this way, the mobile station in idle mode receiving the multicast may transmit the received radio wave quality (received quality) to the radio base station side apparatus by using the band for transmitting the uplink data, the band having been allocated to the mobile station 118 based on the band allocation message.

Further, by doing in this way, when the radio base station side apparatus transmits the multicast data of the MBS next time, the following processes are performed. The radio base station side apparatus determines whether, in an MBS Zone in the distribution area of the multicast data, uplink bands have been allocated in the previous distribution of the multicast data to all the mobile stations in idle mode having not obtained effective received quality. Then, when determining that the uplink bands have been allocated in past distribution of the multicast data to the MBS Zone, the radio base station side apparatus adaptively modulates the multicast data to be distributed to the MBS Zone based on the received quality group corresponding to the idle mobile station group having obtained effective received quality and the received quality group corresponding to the normal mobile station group having obtained effective received quality. For example, the radio base station side apparatus adaptively modulates the multicast data to be distributed to the MBS Zone based on the received quality group corresponding to the idle mobile station group having obtained effective received quality and the received quality group corresponding to the normal mobile station group having obtained effective received quality and based on the minimum received quality of the received quality group.

Fifth Embodiment

An applicable example of a communication system according to this embodiment of the present invention is described. As an example of this embodiment, WiMAX (Worldwide Interoperability for Microwave Access) is described. However, besides WiMAX, the present invention may also be applied to a system supporting the discontinuous reception scheme and the multicast distribution scheme.

In a communication system according to this embodiment of the present invention, a Time Division Duplex (TDD) scheme is applied. In TDD, an uplink signal and a downlink signal are transmitted using the same frequency band, and the uplink and the downlink are switched in high speed to achieve full-duplex communications. The transmission frames in the TDD scheme includes a downlink sub frame transmitting a downlink signal and an uplink sub frame transmitting an uplink signal. Further, in the communication system according to this embodiment of the present invention, an Orthogonal Frequency Division Multiplexing (OFDM) scheme/Orthogonal Frequency Division Multiple Access (OFDMA) are applied.

Figure 8:
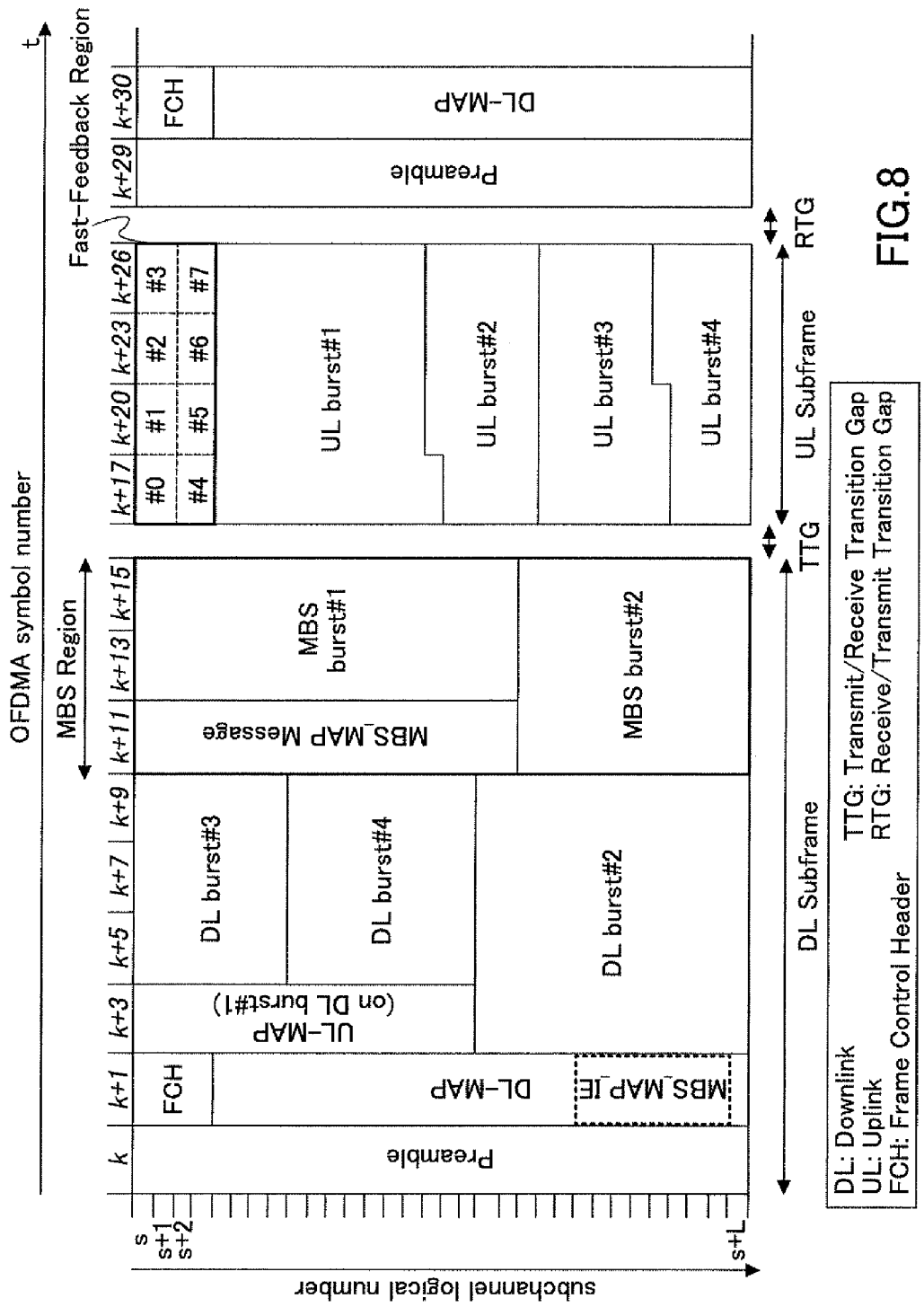
FIG. 8 is a drawing illustrating an example of a frame format according to an embodiment of the present invention.

A communication system according to this embodiment of the present invention includes a base station 112. Further, the communication system according to this embodiment of the present invention includes a mobile station 118. The base station 112 and the mobile station 118 perform radio communications based on the Time Division Duplex (TDD) scheme. As illustrated in FIG. 8, the transmission frame in the Time Division Duplex (TDD) scheme includes a downlink (DL) subframe and an uplink (UL) subframe. One frame includes a pair of the downlink (DL) subframe and the uplink (UL) subframe. As an example, FIG. 8 illustrates OFDMA-PHY. In FIG. 8, the vertical axis denotes Subchannel Logical Number, and the lateral axis denotes Symbol Number. The lateral axis represents time. Further, in the downlink subframe, one slot includes two symbols. In the uplink subframe, one slot includes three symbols. Further, the downlink subframe includes a Preamble, Frame Control Header (FCH), downlink map (DL-MAP), uplink map (UL-MAP), downlink burst (DL burst), multicast and broadcast service map message (MBS_MAP Message), and MBS burst. The downlink burst may be divided (separated) in plural regions. Further, the radio resources to which MBS_MAP Message and MBS burst are allocated may be called MBS Region.

FIG. 8 illustrates a case where the downlink burst is divided (separated) into four regions. Further, the MBS burst may be divided (separated) into plural regions. FIG. 8 illustrates a case where the MBS burst is divided (separated) into two regions.

The Preamble includes a preamble pattern which may be necessary for the mobile station 118 to realize the frame synchronization. The FCH includes information about Subchannel to be used and DL-MAP disposed next to FCH. The DL-MAP includes mapping information of DL burst of DL subframe. By reading DL-MAP, the mobile station 118 may distinguish UL-MAP (transmitted using DL burst#1), DL burst, and MBS Region. Herein, the term burst refers to a region having a combination between the same modulation scheme and the same Forward Error Correction. Based on the DL-MAP/UL-MAP, the combination between the modulation scheme of the bursts and FEC is designated. In bursts, various control messages described in IEEE 802.16e and user data are transmitted. DL-MAP includes various types of Information Elements (IE). For example, MBS_MAP_IE included in DL-MAP indicates MBS Region in DL subframe. MBS_MAP_IE includes, for example, Symbol Offset in the frame to indicate the position of the MBS Region. The MBS Region includes MBS_MAP Message indicating a configuration in the MBS Region, and MBS burst transmitting actual multicast data. However, according to IEEE 802.16e standard, the MBS_MAP Message indicates at least a configuration in the MBS Region in a second or later frame from the current frame. By receiving MBS-MAP_IE, the mobile station 118 may read MBS-MAP Message. FIG. 9 illustrates an example of MBS-MAP Message. The MBS-MAP Message includes MBS_DATA_IE.

Further, UL-MAP includes Fast-Feedback Region of UL subframe and mapping information of UL burst. By reading UL-MAP, the mobile station 118 may distinguish Fast-Feedback Region and UL Burst (#1 through #4). Further, as illustrated in FIG. 8, the Fast-Feedback Region may be divided (separated) into plural slots. FIG. 8 illustrates an example where Fast-Feedback Region is divided (separated) into slots #0-#7. The slots are numbered from the left upper portion to the right lower portion. This numbering method from the left upper portion to the right lower portion is fixedly described in IEEE 802.16e standard. The Fast-Feedback-slot is a unit in allocation. In this embodiment, this Fast-Feedback-slot is allocated to the mobile station 118 in idle mode receiving the multicast. By doing in this way, the mobile station 118 in idle mode receiving the multicast may transmit uplink data. Fast-Feedback-Region is an area suitably used for a rapid Feedback of data from mobile station to base station, the purpose of the data originally fixedly determined in IEEE 802.16e standard. Therefore, it may be preferable to use Fast-Feedback-Region to transmit temporary uplink data having the determined data amount. For example, to transmit uplink data using UL burst, it may be necessary to add various header to the data to be transmitted. However, in Fast-Feedback-Region, when Fast-Feedback-slot is allocated to the mobile station, the allocation is performed while the purpose is also limited. Therefore, it may not be necessary to add various headed to the data to be transmitted for flexible data transmission.

Further, the uplink subframe includes Fast-Feedback Region and uplink burst (UL burst). The uplink burst may be divided (separated) into plural regions. FIG. 8 illustrates a case where the uplink burst is divided (separated) into four regions. In FIG. 8, TTG (Transmit/Receive Transition Gap) denotes a gap provided when switching from transmission to reception, and RTG (Receive/Transmit Transition Gap) denotes a gap provided when switching from reception to transmission.

The base station 112 maps the band allocation message to the MBS_MAP Message of MBS Region in the downlink subframe. Further, the base station 112 may map the band allocation message to the MBS_MAP_IE of the DL-MAP in the downlink subframe. For example, the base station 112 includes the information element of allocating the Fast-Feedback-Channel in the band allocation message for transmitting uplink data. By doing in this way, it may become possible for the mobile station 118 in idle mode receiving multicast to transmit temporary uplink data having a determined data amount without transmitting and receiving control messages to and from a specific base station 112 and without changing its mode from idle mode to normal mode.

For example, as an information element for allocating Fast-Feedback-Channel, the base station 112 includes a reception acknowledgement allocation element (MBS_ACK_Alloc_IE). For example, the MBS_ACK_Alloc_IE may include a Mobile Station IDentifier (MSID), Frame Offset, and Allocation Offset in Fast-Feedback Region. By doing in this way, the idle mobile station 118 receiving multicast may transmit Acknowledgement (ACK) of multicast data to the radio base station side apparatus.

FIG. 9 illustrates a MBS_MAP Message format. Further, in FIG. 9, MBS_MAP Message includes plural MBS_DATA_IE. Further, in FIG. 9, MBS_MAP Message includes plural Extended_MBS_DATA_IE. Further, in FIG. 9, MBS_MAP Message includes MBS_DATA_Time_Diversity_IE. Each IE (Information Element) describes, for example, a modulation scheme of one MBS burst described with reference to FIG. 8. The modulation scheme and the like are information which may be necessary for the mobile station 118 to decode and read out MBS burst. The MBS_DATA_IE may be the most fundamental format. The Extended_MBS_DATA_IE and the MBS_DATA_Time_Diversity_IE are extended formats based on the MBS_DATA_IE. In this embodiment, a format is indicated where the above-described MBS_ACK_Alloc_IE is added to the MBS_DATA_IE. MBS_ACK_Alloc_IE may be added to Extended_MBS_DATA_IE. MBS_ACK_Alloc_IE may be added to MBS_DATA_Time_Diversity_IE.

As illustrated in FIG. 10, MBS_DATA_IE includes information of the target MBS burst of MBS_DATA_IE. As information items of the MBS burst, MBS Burst Frame Offset, Multicast CID, MBS DIUC, OFDMA Symbol Offset, Subchannel Offset, Boosting, No. OFDMA Symbols, No. Subchannels, and Repetition Coding Indication may be included. Further, MBS_DATA_IE includes information indicating MBS_MAP Message to be transmitted next. As the information indicating MBS_MAP Message to be transmitted next, Next MBS MAP change indication, Next MBS Frame Offset, Next MBS OFDMA Symbol Offset, Next MBS No. OFDMA Symbols, and Next MBS No. OFDMA Subchannels may be included. Further, MBS_DATA_IE includes information about newly added MBS_ACK_Alloc_IE. As the information about the MBS_ACK_Alloc_IE, No. of MBS_ACK_Alloc_IE and MBS_ACK_Alloc_IE( ) may be included.

For example, the mobile station 118 determines whether MBS burst is configured based on Multicast CID, the MBS burst transmitting multicast data to be received based on MBS_DATA_IE. Then, when determining that the MBS burst transmitting multicast data to be received based on MBS_DATA_IE is configured, the mobile station 118 reads the MBS burst. As described in Notes of MBS Burst Frame Offset included in MBS_DATA_IE format illustrated in FIG. 10, the MBS burst is at least in a second later frame from the current frame.

As illustrated in FIG. 11, MBS_ACK_Alloc_IE includes Mobile Station IDentifier (MSID), Allocation Offset, and Frame Offset. For example, the mobile station 118 in idle mode receiving multicast recognizes that allocation of uplink band is for the mobile station based on MSID. Further, the mobile station 118 recognizes the frame to which the band is allocated based on Frame Offset. Further, the mobile station 118 recognizes which Fast-Feedback-slot included in the Fast-Feedback Region of the frame is to be used based on Allocation Offset. Then, the mobile station 118 returns the Acknowledgement (ACK) of multicast data transmitted by the received MBS burst to the base station 112 using the Fast-Feedback-slot.

On the other hand, the base station 112 may disperse Acknowledgement (ACK) to plural frames to avoid that the Acknowledgement (ACK) is concentration on a certain frame (i.e. a certain timing). For example, the base station 112 designates Frame Offset to avoid the concentration on a certain frame.

According to this embodiment of the present invention, MBS_ACK_Alloc_IE allocating Fast-Feedback-Channel to the idle mobile station 118 receiving multicast is newly included in MBS_DATA_IE of MBS_MAP Message. Further, MBS_ACK_Alloc_IE may be newly included in Extended MBS_DATA_IE of MBS_MAP Message. Further, MBS_ACK_Alloc_IE may be newly included in MBS_DATA_Time_Diversity_IE of MBS_MAP Message. By doing in this way, the mobile station 118 in idle mode receiving multicast may transmit the Acknowledgement (ACK) of the multicast data to the radio base station side apparatus.

A case is described where, in a communication system according to this embodiment of the present invention, MBS_ACK_Alloc_IE is provided as the information element of allocating Fast-Feedback-Channel, and the MBS_ACK_Alloc_IE is included in MBS_MAP_IE.

FIG. 12 illustrates an MBS_MAP_IE format according to this embodiment of the present invention.

MBS_MAP_IE is one information element of DL-MAP of the transmission frame as described with reference to FIG. 8. The DL-MAP includes the MBS_MAP_IE.

The MBS_MAP_IE includes MBS Zone ID, information designating MBS Region of Multi-BS MBS/Single-BS MBS, and information of newly added MBS_ACK_Alloc_IE. MBS Region designated in MBS_MAP_IE indicates the MBS Region in the frame transmitting the MBS_MAP_IE. Unlike the above-described MBS_MAP Message, the information of later frame is not included. However, as is the case of being included in MBS_MAP Message, MBS_ACK_Alloc_IE in MBS_MAP_IE may indicate Fast_Feedback_Region in later frame by Frame Offset. This is because there may be a case where multicast data are actually transmitted not in the frame transmitting MBS_MAP_IE but in a later frame. In this case, Acknowledgement (ACK) may be required to respond to the case.

Similar to the MBS_ACK_Alloc_IE as described with reference to FIG. 11, MBS_ACK_Alloc_IE included in MBS_MAP_IE includes the MSID, Allocation Offset, and Frame Offset.

According to this embodiment of the present invention, MBS_ACK_Alloc_IE for allocating Fast-Feedback-Channel to the idle mobile station receiving multicast is newly included in MBS_MAP_IE. By doing in this way, the mobile station in idle mode receiving multicast may transmit the Acknowledgement (ACK) of the multicast data to the radio base station side apparatus.

Sixth Embodiment

Another applicable example of a communication system according to this embodiment of the present invention is described. As an example of this embodiment, WiMAX is described.

In this embodiment, as the information element to allocate the above-described Fast-Feedback-Channel, a Received Quality Information Allocation Element (MBS_CQICH_Alloc_IE) is provided. For example, the MBS_CQICH_Alloc_IE may include the Mobile Station IDentifier (MSID), Frame Offset, and Allocation Offset in Fast-Feedback Region. By doing in this way, the mobile station in idle mode receiving multicast may transmit received radio wave quality (received quality) to the radio base station side apparatus. When receiving the incoming data to the mobile station, the radio base station side apparatus may broadcast the Paging Message adaptively modulated based on the received quality to the mobile station. Further, when receiving the incoming data to the mobile station, based on the received quality, the radio base station side apparatus may adaptively modulate multicast data to be distributed.

FIGS. 13 and 14 illustrate MBS_MAP Message format when MBS_CQICH_Alloc_IE is included in the information element for allocating Fast-Feedback-Channel.

In this embodiment, on the basis of the above-described frame configuration in IEEE 802.16e standard, MBS_CQICH_Alloc_IE as illustrated in FIGS. 13 and 14 is newly described.

As illustrated in FIG. 13, MBS_CQICH_Alloc_IE is newly included in MBS_DATA_IE of MBS_MAP Message. Further, MBS_CQICH_Alloc_IE may be newly included in Extended_MBS_DATA_IE of MBS_MAP Message. Further, MBS_CQICH_Alloc_IE may be newly included in MBS_DATA_Time_Diversity_IE of MBS_MAP Message.

Further, as illustrated in FIG. 14, MBS_CQICH_Alloc_IE may include the Mobile Station IDentifier (MSID), Frame Offset, and Allocation Offset in Fast-Feedback Region. Further, other information elements indicated in FIG. 14 may be included. The Mobile Station IDentifier (MSID) indicates an allocation target of the idle mobile station receiving multicast. The Frame Offset indicates the frame transmitting Fast_Feedback_Region including an allocation target of Fast_Feedback_Slot. The Allocation Offset indicates an allocation target of Fast_Feedback_Slot number in Fast_Feedback_Region.

The Period(p) and Duration(d) in FIG. 14 may not be essential. By including the Period(p) and Duration(d), due to the allocation in MBS_CQICH_Alloc_IE, the allocation become effective during the period designated by Duration. Namely, the number of the allocation times is not only once. In other words, in a period designation by Duration, it may become possible to allocate Fast_Feedback_Slot of Fast_Feedback_Region in every 2 raised to the power of "Period" frames.

According to this embodiment of the present invention, by including MBS_CQICH_Alloc_IE in the information element for allocating Fast-Feedback-Channel, the mobile station in idle mode receiving multicast may transmit received radio wave quality (received quality) to the radio base station side apparatus.

FIG. 15 illustrates MBS_MAP_IE format when MBS_CQICH_Alloc_IE is included in the information element for allocating Fast-Feedback-Channel.

As described above, MBS_MAP_IE is included in DL-MAP as one information element of DL-MAP.

MBS_CQICH_Alloc_IE included in MBS_MAP_IE may include the Mobile Station IDentifier (MSID), Frame Offset, and Allocation Offset in Fast-Feedback Region. Among the information elements included in MBS_CQICH_Alloc_IE, Period(p) and Duration(d) may be set as optional.

According to this embodiment of the present invention, MBS_CQICH_Alloc_IE is included in the information element for allocating Fast-Feedback-Channel. By doing in this way, the mobile station in idle mode receiving multicast may transmit received radio wave quality (received quality) to the radio base station side apparatus.

Further, in the above embodiments, a band for transmitting the Acknowledgement (ACK) and a band for transmitting the received quality in the same allocation message may be allocated to the mobile station in idle mode receiving multicast. For example, when the mobile station in idle mode receiving multicast transmits the received quality by using the Fast_Feedback_Slot allocated in MBS_CQICH_Alloc_IE, the received quality may mean Acknowledgement (ACK) indicating the reception of the target multicast data. By doing in this way, the band allocation for transmitting the Acknowledgement (ACK) may be merged with the band allocation for transmitting the received quality.

Seventh Embodiment

Another applicable example of a communication system according to this embodiment of the present invention is described. As an example of this embodiment, WiMAX is described.

In this embodiment, the radio base station side apparatus includes the information element for allocating Fast-Feedback-Channel in a header of a Media Access Control Packet Data Unit (MAC PDU) in a frame as band allocation message for transmitting uplink data.

By doing in this way, the mobile station in idle mode receiving multicast may transmit temporary uplink data having a determined data amount without transmitting and receiving control messages to and from a specific base station and without changing its mode from idle mode to normal mode.

Further, in this embodiment, MBS_ACK_Alloc_Extended_Subheader is included in the information element for allocating Fast-Feedback-Channel. The MBS_ACK_Alloc_Extended_Subheader may include MBS_ACK_Alloc_IE having the Mobile Station IDentifier (MSID), Frame Offset, and Allocation Offset in Fast-Feedback Region.

The mobile station in idle mode receiving multicast may transmit the Acknowledgement (ACK) of multicast data to the radio base station side apparatus.

Figure 16:
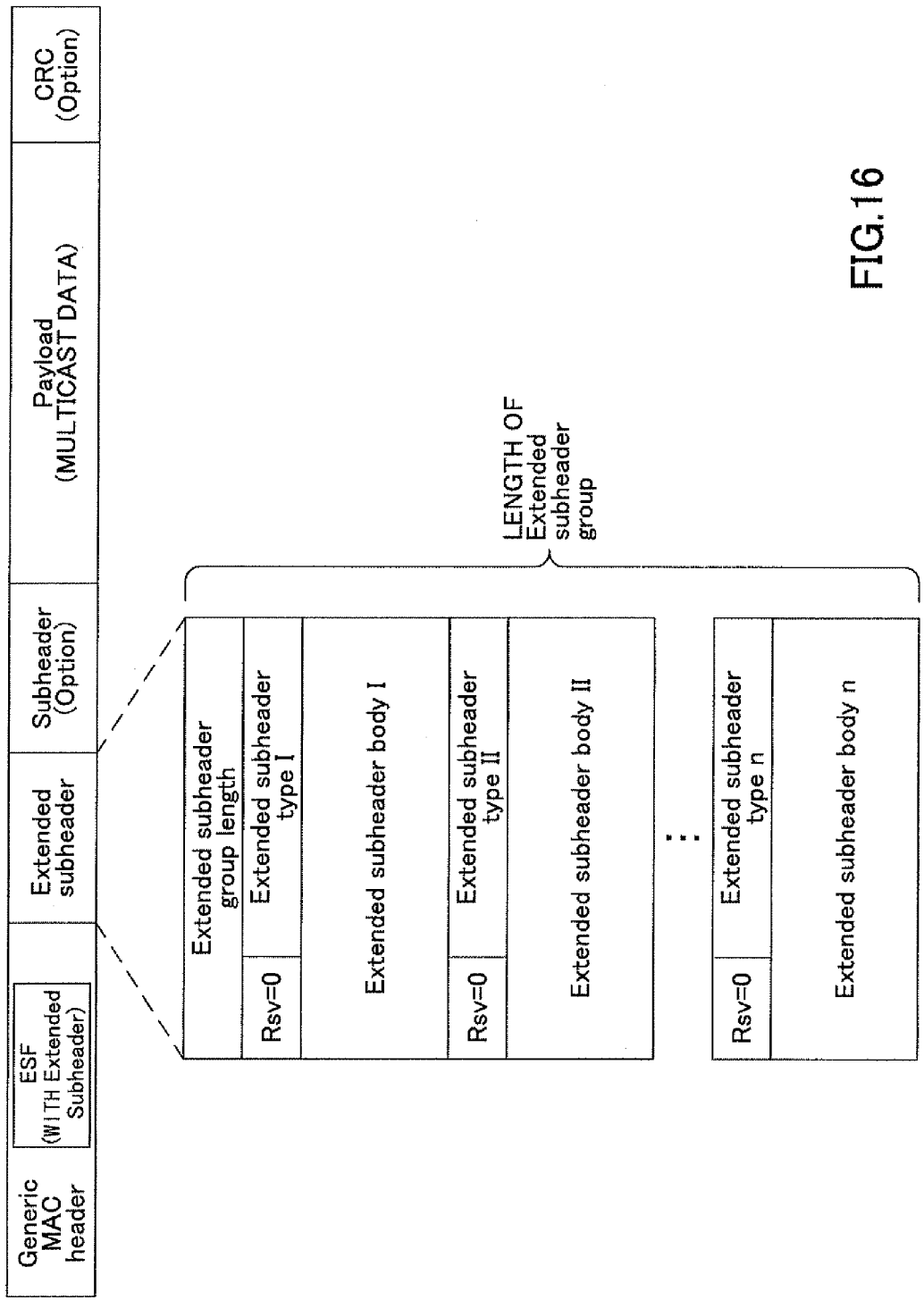
FIG. 16 is a drawing illustrating an MAC PDU according to an embodiment of the present invention.

FIG. 16 illustrates a format of MAC (Media Access Control) PDU (Protocol Data Unit) according to this embodiment of the present invention. In WiMAX, the burst in a frame of Physical (PHY) layer described with reference to FIG. 8 contains encoded plural data units of MAC layer. By reading the MAC PDU, the mobile station in idle mode receiving multicast may receive multicast data.

In FIG. 16, the MAC PDU includes Generic MAC header, Extended subheader, Subheader, Payload (multicast data), and CRC. The Extended subheader, Subheader, and CRC may be optional.

In this embodiment, MBS_ACK_Alloc_Extended_Subheader is included in Extended Subheader. MBS_ACK_Alloc_Extended_Subheader may be the band allocation message. Therefore, Extended subheader may become a necessary subheader. In this embodiment, a value indicating that "with Extended subheader" is set in Extended Subheader Field (ESF) of Generic MAC header.

Further, as illustrated in FIG. 16, Extended subheader is a group of plural Extended subheaders. In this embodiment, as one of Extended subheader group, a newly provided MBS_ACK_Alloc_Extended_subheader is included.

FIG. 17 illustrates an example of MBS_ACK_Alloc_Extended_subheader format according to this embodiment of the present invention. MBS_ACK_Alloc_Extended_subheader includes MBS_ACK_Alloc_IE for target mobile station in idle mode receiving multicast. MBS_ACK_Alloc_IE may be the band allocation message. MBS_ACK_Alloc_IE may include MSID, Allocation Offset, and Frame Offset. Multicast MAC PDU is received by plural mobile stations. Therefore, based on MAC PDU alone, the mobile station may not be specified. Therefore, it may be necessary to designate MSIDs in subheader of MAC PDU in order to include plural allocation information for target MSIDs in MAC PDU.

According to this embodiment of the present invention, MBS_ACK_Alloc_Extended_subheader for allocating Fast-Feedback-Channel to the mobile station in idle mode receiving multicast is newly included in MAC PDU. By doing in this way, the mobile station in idle mode receiving multicast may transmit the Acknowledgement (ACK) of multicast data to the radio base station side apparatus.

Further, in this embodiment, as a method of including the information element for allocating Fast-Feedback-Channel in the header of MAC PDU as the band allocation message for transmitting uplink data, a case is described where Extended Subheader is used. As another method, an information element for allocating Fast-Feedback-Channel may be included in Subheader. When Subheader is used, since all the Subheader types are already used up, instead of newly defining Subheader, existing Subheader may be extended so as to include band allocation message.

Eighth Embodiment

Another applicable example of a communication system according to this embodiment of the present invention is described. As an example of this embodiment, WiMAX is described.

In this embodiment, the radio base station side apparatus includes an information element for allocating Fast-Feedback-Channel as band allocation message for transmitting uplink data in MAC PDU header in frames.

By doing in this way, the mobile station in idle mode receiving multicast may transmit temporary uplink data having a determined data amount without transmitting and receiving control messages to and from a specific base station and without changing its mode from idle mode to normal node.

Further, in this embodiment, MBS_CQICH_Alloc_Extended_subheader is included in the above-described information element for allocating Fast-Feedback-Channel. The MBS_CQICH_Alloc_Extended_subheader may include the Mobile Station IDentifier (MSID), Frame Offset, and Allocation Offset in Fast-Feedback Region. By doing in this way, the mobile station in idle mode receiving multicast may transmit received radio wave quality (received quality) to the radio base station side apparatus.

Further, when receiving the incoming data to the mobile station, the radio base station side apparatus may broadcast the Paging Message adaptively modulated based on the received quality to the mobile station. Further, when receiving the incoming data to the mobile station, the radio base station side apparatus may adaptively modulate multicast data to be distributed based on the received quality.

FIG. 18 illustrates an example of MBS_CQICH_Alloc Extended subheader format according to this embodiment of the present invention. MBS_CQICH_Alloc Extended subheader may be included in Extended Subheader of MAC PDU described with reference to FIG. 16. MBS_CQICH_Alloc Extended subheader includes MBS_CQICH_Alloc_IE for the target mobile station in idle mode receiving multicast. MBS_CQICH_Alloc_IE may include the Mobile Station IDentifier (MSID), Frame Offset, and Allocation Offset in Fast-Feedback Region. Further, MBS_CQICH_Alloc_IE may include Period and Duration as option.

Multicast MAC PDU is received by plural mobile stations. Therefore, based on MAC PDU alone, the mobile station may not be specified. Therefore, it may be necessary to designate MSIDs in subheader of MAC PDU in order to include plural allocation information for target MSIDs in MAC PDU.

According to this embodiment of the present invention, MBS_CQICH_Alloc Extended subheader for allocating Fast-Feedback-Channel to the mobile station in idle mode receiving multicast is newly included in MAC PDU. By doing in this way, the mobile station in idle mode receiving multicast may transmit received radio wave quality (received quality) to the radio base station side apparatus.

Further, the mobile station in idle mode receiving multicast may merge a band allocation for transmitting Acknowledgement (ACK) with a band allocation for transmitting received quality so as to merge using one allocation message. For example, when the mobile station in idle mode receiving multicast transmits the received quality by using the Fast_Feedback_Slot allocated in MBS_CQICH_Alloc_IE, the received quality may mean Acknowledgement (ACK) indicating the reception of the target multicast data. By doing in this way, the band allocation for transmitting the Acknowledgement (ACK) may be merged with the band allocation for transmitting the received quality.

Another applicable example of a communication system according to this embodiment of the present invention is described. As an example of this embodiment, WiMAX is described.

In this embodiment, the radio base station side apparatus includes an information element for allocating Fast-Feedback-Channel in UL-MAP IE of UL-MAP in downlink subframe as band allocation message for transmitting uplink data. By doing in this way, the mobile station in idle mode receiving multicast may transmit temporary uplink data having a determined data amount without transmitting and receiving control messages to and from a specific base station and without changing its mode from idle mode to normal node.

Further, in this embodiment, as the information element for allocating Fast-Feedback-Channel, as one type of Extended UIUC, MBS_ACK_IE is included. The MBS_ACK_IE may include MBS_ACK_Alloc_IE having the Mobile Station IDentifier (MSID), Frame Offset, and Allocation Offset in Fast-Feedback Region. By doing in this way, the mobile station in idle mode receiving multicast may transmit the Acknowledgement (ACK) of multicast data to the radio base station side apparatus.

FIG. 19 illustrates UL-MAP IE format according to this embodiment of the present invention. The UL-MAP IE format includes Multicast CID. Based on the Multicast ID, target multicast data are identified. Further, UL-MAP IE includes UIUC. As UIUC, a value "15" is designated. Equation UIUC=15 denotes Extended UIUC. This value of UIUC is designated when UL-MAP IE is extended.

In this embodiment, as extended IE, MBS_ACK_IE is newly included. FIG. 20 illustrates an example of MBS_ACK_IE. By referring to the value of Extended UIUC of MBS_ACK_IE, the mobile station in idle mode receiving multicast may recognize the MBS_ACK_IE.

UL-MAP IE format includes MBS_ACK_IE. MBS_ACK_IE includes MBS_ACK_Alloc_IE for target mobile station in idle mode receiving multicast. MBS_ACK_Alloc_IE may include the MSID, Allocation Offset, and Frame Offset.

According to this embodiment of the present invention, MBS_ACK_IE for allocating Fast-Feedback-Channel to the mobile station in idle mode receiving multicast is newly included in UL-MAP IE. By doing in this way, the mobile station in idle mode receiving multicast may transmit the Acknowledgement (ACK) of multicast data to the radio base station side apparatus.

Another applicable example of a communication system according to this embodiment of the present invention is described. As an example of this embodiment, WiMAX is described.

In this embodiment, as band allocation message for transmitting uplink data, the radio base station side apparatus includes the information element for allocating Fast-Feedback-Channel in UL-MAP IE of UL-MAP of downlink subframe. By doing in this way, the mobile station in idle mode receiving multicast may transmit temporary uplink data having a determined data amount without transmitting and receiving control messages to and from a specific base station and without changing its mode from idle mode to normal node.

Further, in this embodiment, as information element for allocating Fast-Feedback-Channel, as one kind of Extended UIUC, MBS_CQICH_IE is included. The MBS_CQICH_IE may include MBS_CQICH_Alloc_IE having the Mobile Station IDentifier (MSID), Frame Offset, and Allocation Offset in Fast-Feedback Region. By doing in this way, the mobile station in idle mode receiving multicast may transmit received radio wave quality (received quality) to the radio base station side apparatus.

Further, when receiving the incoming data to the mobile station, the radio base station side apparatus may broadcast the paging message adaptively modulated based on the received quality to the mobile station. Further, based on the received quality, the radio base station side apparatus may adaptively modulate multicast data to be distributed.

FIG. 21 illustrates UL-MAP IE format according to an embodiment of the present invention. UL-MAP IE format includes Multicast CID. Based on the Multicast CID, multicast data are identified. Further, UL-MAP IE format includes UIUC. As UIUC, a value "15" is designated. Equation UIUC=15 denotes Extended UIUC. This value of UIUC is designated when UL-MAP IE is extended.

In this embodiment, as extended IE, MBS_CQICH_IE is newly included. FIG. 22 illustrates an example of MBS_CQICH_IE. By referring to the value of Extended UIUC of MBS_CQICH_IE, the mobile station in idle mode receiving multicast may recognize the MBS_CQICH_IE.

In UL-MAP IE format, MBS_CQICH_IE is included. MBS_CQICH_IE includes MBS_CQICH_Alloc_IE for target mobile station in idle mode receiving multicast. MBS_CQICH_Alloc_IE may include the Mobile Station IDentifier (MSID), Frame Offset, and Allocation Offset in Fast-Feedback Region. The MBS_CQICH_Alloc_IE may include Period and Duration as option.

According to this embodiment of the present invention, MBS_CQICH_IE for allocating Fast-Feedback-Channel to the mobile station is newly included in UL-MAP IE. By doing in this way, the mobile station in idle mode receiving multicast may transmit received radio wave quality (received quality) to the radio base station side apparatus.

Another applicable example of a communication system according to this embodiment of the present invention is described. As an example of this embodiment, WiMAX is described.

In this embodiment, UL burst described with reference to FIG. 8 is allocated to each mobile station in idle mode receiving multicast. Therefore, this differs from the case of above described embodiment where Fast-Feedback-Channel is allocated.

By doing in this way, the mobile station in idle mode receiving multicast may transmit temporary uplink data having a determined data amount without transmitting and receiving control messages to and from a specific base station and without changing its mode from idle mode to normal node.

FIG. 23 illustrates UL-MAP IE format according to this embodiment of the present invention. As illustrated in FIG. 23, UL burst is allocated. In UL-MAP IE, there may be a case where, as CID, Basic CID having one-to-one relationship with the mobile station is designated. However, the Basic CID is not allocated because the idle mobile station receiving multicast data is in idle mode. Therefore, as CID, Multicast CID is designated. Further, MSID is designated by MBS_UL_Burst_IE which is Extended IE. By doing in this way, UL burst may be allocated to the mobile station in idle mode receiving a specific multicast.

FIG. 24 illustrates an example of MBS_UL_Burst_IE format. In MBS_UL_Burst_IE format, MSID designates the mobile station in idle mode receiving multicast. UIUC designates modulation information of UL burst designated by MBS_UL_Burst_IE. However, when received quality of target mobile station in idle mode receiving multicast is not obtained, modulation information of UL burst is designated assuming that the received quality is the minimum received quality. Duration denotes the number of OFDMA slots and designates the size of UL burst designated by MBS_UL_Burst_IE. Upon designating UL burst, it may not be necessary to designate information items indicating OFDMA symbol/subchannel corresponding to vertical/lateral axes. This is because, according standard specification, upon designating UL burst, in the order of UP-MAP IE appearing UL-MAP, OFDMA symbols designated by Duration are allocated by the OFDMA slot from the left upper portion to the right lower portion, and when reaching at right end, it loops back to the left end to make a loop. Therefore, by designating Duration only, UL burst in frame may be designated.

According to this embodiment of the present invention, as new UL-MAP IE of UL-MAP of downlink subframe, MBS_UL_Burst_IE is newly included that designates UL burst to be used by the mobile station in idle mode receiving multicast. By doing in this way, the mobile station in idle mode receiving multicast may transmit temporary uplink data having a determined data amount without transmitting and receiving control messages to and from a specific base station and without changing its mode from idle mode to normal node.

Unlike Fast-Feedback-Channel, when UL burst is allocated, it may not be necessary to limit the usage. Since various header may be added to UL burst, the base station may determine whether Acknowledgement (ACK) or received quality based on the header.

According to this embodiment of the present invention, the mobile station in idle mode receiving multicast may transmit temporary uplink data having a determined data amount without transmitting and receiving control messages to and from a specific base station and without changing its mode from idle mode to normal node.

Further, according to this embodiment of the present invention, the mobile station in idle mode receiving multicast may transmit the Acknowledgement (ACK) of multicast data to the radio base station side apparatus by using a band allocated to the mobile station based on the band allocation message for transmitting uplink data.

Further, according to this embodiment of the present invention, the mobile station in idle mode receiving multicast may transmit the received radio wave quality (received quality) of multicast data to the radio base station side apparatus by using a band allocated to the mobile station based on the band allocation message for transmitting uplink data. Further, when receiving the incoming data to the mobile station, the radio base station side apparatus may broadcast the paging message adaptively modulated based on the received quality to the mobile station.

Further, according to this embodiment of the present invention, the mobile station in idle mode receiving multicast may transmit the received radio wave quality (received quality) of multicast data to the radio base station side apparatus by using a band allocated to the mobile station based on the band allocation message for transmitting uplink data. Further, based on the received quality of the mobile station in idle mode receiving multicast, the radio base station side apparatus may adaptively modulate multicast data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that various changes, substitutions, and alterations could be made hereto without departing from the sprit and scope of the invention.

What is claimed is:

1. A communication system comprising:
   mobile stations that receive multicast data and paging announce, wherein the paging announce is received using a discontinuously received frame;
   a communication apparatus that includes:
   a searching unit that searches for mobile stations in idle mode from among the mobile stations, wherein the mobile stations in idle mode are not registered to any specific base stations, and
   a selecting unit that selects mobile stations belonging to a paging group, wherein the paging group is a group constituted of one or more base stations from which the mobile stations in idle mode receive the multicast data;
   a base station that belongs to the paging group includes:
   an allocating unit that allocates radio resources to the selected mobile stations, the radio resources being for transmitting an uplink signal, and
   an including unit that includes information of the radio resources allocated by the allocating unit and the multicast data in a radio frame to be transmitted to the selected mobile stations.

2. The communication system according to claim 1, wherein
   the including unit includes, as the information of the radio resources, an information element for allocating Fast-Feedback-Channel in Multicast and Broadcast Service Map Message (MBS_MAP Message) of an MBS Region of the radio frame or Multicast and Broadcast Service Map Information Element (MBS_MAP_IE) of Downlink Map (DL-MAP) of the radio frame.

3. The communication system according to claim 1, wherein,
   the including unit includes, as the information of the radio resources, an information element for allocating Fast-Feedback-Channel in a header of a Media Access Control Packet Data Unit (MAC PDC) of the radio frame.

4. The communication system according to claim 1, wherein,
   the including unit includes, as the information of the radio resources, an information element for allocating Fast-Feedback-Channel in Uplink Map Information Element (UL-MAP IE) of UL-MAP of the radio frame.

5. The communication system according to claim 1, wherein,
   the including unit includes an information element indicating the radio resources in an information element for allocating Uplink burst (UL-burst) included in Uplink Map Information Element (UL-MAP IE) of UL-MAP of the radio frame.

6. The communication system according to claim 1, wherein,
   the information of the radio resources includes Mobile Station Identifier, Frame Offset, and Allocation Offset in Fast-Feedback Region.

7. The communication system according to claim 1, wherein,
   each mobile station comprises:
   a transmitting unit that reports downlink received quality using the radio resources, and
   the base station further comprises:
   a broadcasting unit that, when receiving incoming data to the mobile station, broadcasts paging message adaptively modulated based on the received quality to the mobile station.

8. The communication system according to claim 1, wherein,
   each mobile station comprises:
   a transmitting unit that reports downlink received quality using the radio resources, and
   the communication apparatus comprises:

a determination unit that, when the radio resources are allocated to the mobile station having the reported received quality less than received quality to receive the multicast data, determines adaptive modulation conditions for the multicast data based on a received quality of another mobile station, the received quality being equal to or greater than the received quality to receive the multicast data, and the base station further comprises:

an adaptive modulation performing unit that performs an adaptive modulation process on the multicast data based on the determined adaptive modulation conditions.

9. The communication system according to claim 1, wherein, each mobile station comprises:

a transmission unit that transmits the uplink signal based on the information of the allocated radio resources included in the radio frame transmitting the multicast data.

10. The communication system according to claim 9, wherein the uplink signal is data to be temporarily transmitted, the data having a determined data amount.

11. The communication system according to claim 10, wherein the uplink signal includes an acknowledgement signal of the multicast data.

12. The communication system according to claim 10, wherein the uplink signal includes downlink received quality.

13. The communication system according to claim 10, wherein the uplink signal includes a signal in which an acknowledgement signal of the multicast data and the downlink received quality are multiplexed.

14. A method used in a communication system including mobile stations receiving multicast data and paging announce, wherein the paging announce is received using a discontinuously received reception frame, the method comprising:

searching for mobile stations in idle mode from among the mobile stations receiving multicast data, wherein the mobile stations in idle mode are not registered to any specific base station;

selecting the mobile stations that belong to a paging group, wherein the paging group is a group constituted of one or more base stations from which the mobile stations in idle mode receive the multicast data;

allocating radio resources to the selected mobile stations for transmitting uplink signal; and transmitting a radio frame that includes information of the radio resources and the multicast data to the selected mobile stations.

15. A communication apparatus in a communication system having mobile stations, wherein the mobile stations receive multicast data and paging announce, the paging announce being received via a discontinuously received frame, the communication apparatus comprising:

a searching unit searching for the mobile stations in idle mode from among the mobile stations receiving multicast data, wherein the mobile stations in idle mode are not registered to any specific base stations; and a selecting unit selecting the mobile stations that belong to a paging group, wherein the paging group is a group constituted of one or more base stations from which the mobile stations in idle mode receive the multicast data, wherein a base station in the paging group allocates radio resources for the selected mobile stations for transmitting an uplink signal and transmits a radio frame including information of the allocated radio resources and the multicast data to the selected mobile stations.

* * * * *